(12) United States Patent
Liao et al.

(10) Patent No.: US 12,262,356 B2
(45) Date of Patent: Mar. 25, 2025

(54) CONFIGURATION INFORMATION SENDING METHOD, APPARATUS, AND SYSTEM

(71) Applicant: HUAWEI TECHNOLOGIES CO., LTD., Shenzhen (CN)

(72) Inventors: Shuri Liao, Shanghai (CN); Mengying Ding, Shanghai (CN); Peng Zhang, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 343 days.

(21) Appl. No.: 17/843,834

(22) Filed: Jun. 17, 2022

(65) Prior Publication Data

US 2022/0322319 A1 Oct. 6, 2022

Related U.S. Application Data

(63) Continuation of application No. PCT/CN2019/126266, filed on Dec. 18, 2019.

(51) Int. Cl.
*H04L 1/18* (2023.01)
*H04B 7/06* (2006.01)
(Continued)

(52) U.S. Cl.
CPC ......... *H04W 72/044* (2013.01); *H04W 72/23* (2023.01); *H04W 72/30* (2023.01)

(58) Field of Classification Search
None
See application file for complete search history.

(56) References Cited

U.S. PATENT DOCUMENTS 9,467,900 B2 * 10/2016 Xiong .................. H04W 28/16
11,337,126 B2 * 5/2022 Tseng .................. H04W 72/23
(Continued)

FOREIGN PATENT DOCUMENTS

CN 107734520 A 2/2018
CN 108243395 A 7/2018
(Continued)

OTHER PUBLICATIONS

European Office Action issued in corresponding European Application No. 19956884.1, dated Aug. 28, 2023, pp. 1-5.
(Continued)

*Primary Examiner* — Sithu Ko
(74) *Attorney, Agent, or Firm* — HAUPTMAN HAM, LLP

(57) ABSTRACT

A configuration information sending method and an apparatus is applied to fields such as user cooperation, user relay, and an internet of vehicles. First configuration information is sent to a first user group, where the first configuration information indicates at least one resource element, the first user group includes a first terminal apparatus and a second terminal apparatus, and the first terminal apparatus is configured to assist in information transmission between a first network apparatus and the second terminal apparatus. The first network apparatus sends first downlink control information to the first user group, where the first downlink control information indicates a first resource element in the at least one resource element and a first time-frequency resource, and the first time-frequency resource belongs to the first resource element.

20 Claims, 7 Drawing Sheets

(51) Int. Cl.
*H04W 72/044* (2023.01)
*H04W 72/23* (2023.01)
*H04W 72/30* (2023.01)

(56) References Cited

U.S. PATENT DOCUMENTS

| | | | | |
|---|---|---|---|---|
| 12,058,704 | B2* | 8/2024 | Selvanesan | H04W 72/0453 |
| 12,136,967 | B2* | 11/2024 | Wang | H04B 7/0617 |
| 2015/0003390 | A1 | 1/2015 | Cheng et al. | |
| 2017/0339530 | A1* | 11/2017 | Maaref | H04L 5/0055 |
| 2018/0279289 | A1 | 9/2018 | Islam et al. | |
| 2018/0288746 | A1* | 10/2018 | Zhang | H04L 12/189 |
| 2019/0173715 | A1 | 6/2019 | Li et al. | |
| 2019/0239118 | A1* | 8/2019 | Baghel | H04L 69/24 |
| 2019/0342910 | A1* | 11/2019 | Cao | H04L 5/0091 |
| 2021/0243762 | A1* | 8/2021 | Selvanesan | H04L 5/0062 |
| 2021/0306824 | A1* | 9/2021 | Li | H04W 4/40 |
| 2022/0159643 | A1* | 5/2022 | Lin | H04W 72/20 |

FOREIGN PATENT DOCUMENTS

| | | |
|---|---|---|
| CN | 108293243 A | 7/2018 |
| CN | 109392154 A | 2/2019 |
| CN | 109547947 A | 3/2019 |
| CN | 109691207 A | 4/2019 |
| CN | 110024319 A | 7/2019 |
| WO | 2018137129 A1 | 8/2018 |
| WO | 2019032844 A1 | 2/2019 |
| WO | 2019062627 A1 | 4/2019 |

OTHER PUBLICATIONS

Huawei, HiSilicon, "Further views on Rel-17 work area on NR sidelink enhancements", 3GPP TSG RAN Meeting #85 RP-191831, Sep. 20, 2019,total 13 pages.

Huawei, HiSilicon, "Rel-17 work scope on NR sidelink enhancements for 5G V2X and", 3GPP TSG RAN Meeting #84 RP-191011,Jun. 6, 2019, total 12 pages.

International Search Report issued in corresponding International Application No. PCT/CN2019/126266, dated Aug. 28, 2020, pp. 1-9.

Chinese Notice of Allowance issued in corresponding Chinese Application No. 201980102535.0, dated Apr. 20, 2023, pp. 1-4.

Chinese Office Action issued in corresponding Chinese Application No. 201980102535.0, dated Nov. 2, 2022, pp. 1-12.

Extended European Search Report issued in corresponding European Application No. 19956884.1, dated Aug. 1, 2022, pp. 1-7.

European Office Action issued in corresponding European Patent Application No. 19956884.1, dated Feb. 2, 2024, pp. 1-5.

* cited by examiner

CONFIGURATION INFORMATION SENDING METHOD, APPARATUS, AND SYSTEM

CROSS-REFERENCE TO RELATED APPLICATIONS

This application is a continuation of International Application No. PCT/CN2019/126266, filed on Dec. 18, 2019, the disclosure of which is hereby incorporated by reference in its entirety.

BACKGROUND

User cooperation (User Equipment Cooperation, UE cooperation) is one of characteristics mainly supported by a next generation communication system, significantly improves a system capacity and network coverage, and reduces load at a base station end. A bandwidth part (BandwidthPart, BWP) resource is configured for data transmission on a Uu interface (Uu interface, Uu) link. The BWP resource is a configuration for Uu air interface communication, and is used for communication between a base station and a terminal apparatus. The base station configures different BWPs for different terminal apparatuses, and configure a resource parameter set for a BWP.

In response to the BWP resource for the Uu air interface communication being configured, different resource parameter sets are used for the different terminal apparatuses, to configure a BWP resource for a terminal apparatus. For user cooperation transmission, and further for cooperation transmission in which one user group includes a plurality of terminal apparatuses, a different cooperative time-frequency resource is configured for a terminal apparatus in the user group. Consequently, a time-frequency resource is wasted, and resource utilization efficiency is reduced.

SUMMARY

In at least one embodiment, a configuration information sending method, an apparatus, and a system, are described for improving resource utilization efficiency.

In at least one embodiment, a configuration information sending method is provided. The method is performed by a first network apparatus. The first network apparatus is alternatively a module or a chip in the first network apparatus. The first network apparatus is alternatively a chip or a system-on-a-chip. The method includes: The first network apparatus sends first configuration information to a first user group, where the first configuration information indicates at least one resource element, the first user group includes a first terminal apparatus and a second terminal apparatus, and the first terminal apparatus is configured to assist in information transmission between the first network apparatus and the second terminal apparatus. The first network apparatus sends first downlink control information to the first user group, where the first downlink control information indicates a first resource element in the at least one resource element and a first time-frequency resource, and the first time-frequency resource belongs to the first resource element. The first network apparatus transmits first information with the first terminal apparatus and the second terminal apparatus on the first time-frequency resource.

In at least one embodiment, the first network apparatus configures several resource elements for the first user group by using the first configuration information, and indicates the first resource element and the first time-frequency resource in the first resource element by using the first downlink control information. The first network apparatus configures a same first resource element and a same first time-frequency resource for the first user group including the first terminal apparatus and the second terminal apparatus, so that several terminal apparatuses in the first user group simultaneously communicate with the first network apparatus, a resource element is saved, and resource utilization is improved.

In at least one embodiment, the first network apparatus sends second configuration information to the first terminal apparatus, where the second configuration information indicates at least one resource element used for communication between the first terminal apparatus and the first network apparatus. The first network apparatus sends second downlink control information to the first terminal apparatus, where the second downlink control information indicates a second resource element in the at least one resource element and a second time-frequency resource, and the second time-frequency resource belongs to the second resource element. The first network apparatus communicates with the first terminal apparatus on the second time-frequency resource. The first network apparatus sends third configuration information to the second terminal apparatus, where the third configuration information indicates at least one resource element used for communication between the second terminal apparatus and the first network apparatus. The first network apparatus sends third downlink control information to the second terminal apparatus, where the third downlink control information indicates a third resource element in the at least one resource element and a third time-frequency resource, and the third time-frequency resource belongs to the third resource element. The first network apparatus communicates with the second terminal apparatus on the third time-frequency resource.

In at least one embodiment, the first network apparatus sends the second configuration information to the first terminal apparatus to configure several resource elements for the first terminal apparatus, and indicates the second resource element and determines the second time-frequency resource in the second resource element by sending the second downlink control information, to configure, for the first terminal apparatus, the resource element and the time-frequency resource that are used for the communication between the first terminal apparatus and the first network apparatus. Likewise, the resource element and the time-frequency resource that are used for the communication between the second terminal apparatus and the first network apparatus are also configured for the second terminal apparatus. A resource element and a time-frequency resource that are used for communication between a terminal apparatus and the first network apparatus are configured based on a service requirement and a capability of the terminal apparatus, so that resource configuration flexibility is improved.

In at least one embodiment, the first configuration information and the first downlink control information are scrambled by using a group identifier corresponding to the first user group.

In at least one embodiment, the first network apparatus sends one piece of configuration information and one piece of control information that are scrambled by using the group identifier, to configure a same resource element and a same time-frequency resource for terminal apparatuses in the first user group. The terminal apparatuses in the first user group determine, by identifying the group identifier for scrambling, that the configuration information is sent to the terminal apparatuses. Therefore, a sending manner of multicast or broadcast scrambled by using the group identifier effectively reduces resource overheads of downlink control signaling.

In at least one embodiment, the first network apparatus determines, based on second information from the first terminal apparatus, that the first terminal apparatus is configured to assist in the information transmission between the first network apparatus and the second terminal apparatus. The first network apparatus sends fourth downlink control information to the first terminal apparatus and the second terminal apparatus, where the fourth downlink control information indicates that the first terminal apparatus and the second terminal apparatus belong to the first user group, and the fourth downlink control information is further used to indicate a group identifier corresponding to the first user group.

In at least one embodiment, the first network apparatus determines, by using the second information, that the first terminal apparatus is configured to assist in communication between the first network apparatus and the second terminal apparatus, and sends the fourth downlink control message to the first terminal apparatus and the second terminal apparatus, to notify the first terminal apparatus and the second terminal apparatus that the first terminal apparatus and the second terminal apparatus belong to the first user group and notify the first terminal apparatus and the second terminal apparatus of the group identifier corresponding to the first user group. To correctly receiving and decoding configuration information and downlink control information by a terminal apparatus, the first terminal apparatus and the second terminal apparatus determine that the first terminal apparatus and the second terminal apparatus belong to the first user group and obtain the corresponding group identifier.

In at least one embodiment, a first control resource set belongs to the first resource element, the first control resource set sends fifth downlink control information, the fifth downlink control information indicates a fourth time-frequency resource, and the fourth time-frequency resource belongs to the first resource element. The first network apparatus transmits third information with the first terminal apparatus and the second terminal apparatus on the fourth time-frequency resource.

In at least one embodiment, the first user group receives the fifth control information in the first control resource set in the first resource element. The fifth downlink control information indicates the fourth time-frequency resource in the first resource element. The fourth time-frequency resource transmits the third information between the first user group and the first network apparatus. The fourth time-frequency resource and the first time-frequency resource are different time-frequency resources, which increases flexibility of using a time-frequency resource for communication between the first user group and the first network apparatus.

In at least one embodiment, the second configuration information and the second downlink control information are scrambled by using a user identifier corresponding to the first terminal apparatus, and the third configuration information and the third downlink control information are scrambled by using a user identifier corresponding to the second terminal apparatus.

In at least one embodiment, a terminal apparatus receives configuration information and downlink control information by using a user identifier of the terminal apparatus, and determines, through scrambling performed by using the user identifier of the terminal user, the resource element and the time-frequency resource used for the communication between the terminal and the first network apparatus. In this way, the resources are configured based on the service requirement and the capability of the terminal apparatus, so that the resource configuration flexibility is improved.

In at least one embodiment, the at least one resource element includes at least one bandwidth part resource.

In at least one embodiment, the at least one resource element configured by the first network apparatus for the first user group by using the first configuration information actually includes one or more bandwidth part resources. Subsequently, the first resource element, namely, an active bandwidth part resource, is determined by using the first downlink control information. This increases selectivity of a cooperative time-frequency resource of the first user group.

In at least one embodiment, a configuration information receiving method is provided. The method is performed by a first terminal apparatus. The first terminal apparatus is alternatively a module or a chip in the first terminal apparatus. The first terminal apparatus is alternatively a chip or a system-on-a-chip. The method includes: The first terminal apparatus receives first configuration information from a first network apparatus, where the first configuration information is further sent to another terminal apparatus in a first user group, the first configuration information indicates at least one resource element, the first user group includes the first terminal apparatus and a second terminal apparatus, and the first terminal apparatus assists in information transmission between the first network apparatus and the second terminal apparatus. The first terminal apparatus receives first downlink control information from the first network apparatus, where the first downlink control information is further sent to the another terminal apparatus in the first user group, the first downlink control information indicates a first resource element in the at least one resource element and a first time-frequency resource, and the first time-frequency resource belongs to the first resource element. The first terminal apparatus transmits first information with the first network apparatus on the first time-frequency resource.

In at least one embodiment, the first network apparatus configures several resource elements for the first user group by using the first configuration information, and indicates the first resource element and the first time-frequency resource in the first resource element by using the first downlink control information. The first network apparatus configures a same first resource element and a same first time-frequency resource for the first user group including the first terminal apparatus and the second terminal apparatus, so that several terminal apparatuses in the first user group simultaneously communicate with the first network apparatus, a resource element is saved, and resource utilization is improved.

In at least one embodiment, the first terminal apparatus receives second configuration information from the first network apparatus, where the second configuration information indicates at least one resource element used for communication between the first terminal apparatus and the first network apparatus. The first terminal apparatus receives second downlink control information from the first network apparatus, where the second downlink control information indicates a second resource element in the at least one resource element and a second time-frequency resource, and the second time-frequency resource belongs to the second resource element.

In at least one embodiment, the first network apparatus sends the second configuration information to the first terminal apparatus to configure several resource elements for the first terminal apparatus, and indicates the second resource element and determines the second time-frequency resource in the second resource element by sending the second downlink control information, to configure, for the first terminal apparatus, the resource element and the time-frequency resource that are used for the communication between the first terminal apparatus and the first network apparatus. Likewise, a resource element and a time-frequency resource that are used for communication between the second terminal apparatus and the first network apparatus are also configured for the second terminal apparatus. A resource element and a time-frequency resource that are used for communication between a terminal apparatus and the first network apparatus are configured based on a service requirement and a capability of the terminal apparatus, so that resource configuration flexibility is improved.

In at least one embodiment, the first configuration information and the first downlink control information are scrambled by using a group identifier corresponding to the first user group.

In at least one embodiment, the first network apparatus sends one piece of configuration information and one piece of control information that are scrambled by using the group identifier, to configure a same resource element and a same time-frequency resource for terminal apparatuses in the first user group. The terminal apparatuses in the first user group determine, by identifying the group identifier for scrambling, that the configuration information is sent to the terminal apparatuses. Therefore, a sending manner of multicast or broadcast scrambled by using the group identifier effectively reduces resource overheads of downlink control signaling.

In at least one embodiment, the first terminal apparatus sends second information to the first network apparatus, where the second information indicates that the first terminal apparatus is configured to assist in the information transmission between the first network apparatus and the second terminal apparatus. The first terminal apparatus receives fourth downlink control information from the first network apparatus, where the fourth downlink control information indicates that the first terminal apparatus and the second terminal apparatus belong to the first user group, and the fourth downlink control information is further used to indicate a group identifier corresponding to the first user group.

In at least one embodiment, the first network apparatus determines, by using the second information, that the first terminal apparatus is configured to assist in communication between the first network apparatus and the second terminal apparatus, and sends the fourth downlink control message to the first terminal apparatus and the second terminal apparatus, to notify the first terminal apparatus and the second terminal apparatus that the first terminal apparatus and the second terminal apparatus belong to the first user group and notify the first terminal apparatus and the second terminal apparatus of the group identifier of the first user group. To correctly receiving and decoding configuration information and downlink control information by a terminal apparatus, the first terminal apparatus and the second terminal apparatus determine that the first terminal apparatus and the second terminal apparatus belong to the first user group and obtain the group identifier of the user group.

In at least one embodiment, first control resource set belongs to the first resource element, the first control resource set sends fifth downlink control information, the fifth downlink control information indicates a fourth time-frequency resource, and the fourth time-frequency resource belongs to the first resource element. The first terminal apparatus transmits third information with the first network apparatus on the fourth time-frequency resource.

In at least one embodiment, the fifth downlink control information is received by the first user group in the first control resource set in the first resource element. The fifth downlink control information indicates the fourth time-frequency resource in the first resource element. The fourth time-frequency resource transmits the third information between the first user group and the first network apparatus. The fourth time-frequency resource and the first time-frequency resource are different time-frequency resources, which increases flexibility of using a time-frequency resource for communication between the first user group and the first network apparatus.

In at least one embodiment, the second configuration information and the second downlink control information are scrambled by using a user identifier corresponding to the first terminal apparatus.

In at least one embodiment, a terminal apparatus receives configuration information and downlink control information by using a user identifier of the terminal apparatus, and determines, through scrambling performed by using the user identifier of the terminal user, the resource element and the time-frequency resource used for the communication between the terminal and the first network apparatus. In this way, the resources are configured based on the service requirement and the capability of the terminal apparatus, so that the resource configuration flexibility is improved.

In at least one embodiment, the at least one resource element includes at least one bandwidth part resource.

In at least one embodiment, the at least one resource element configured by the first network apparatus for the first user group by using the first configuration information actually includes one or more bandwidth part resources. Subsequently, the first resource element, namely, an active bandwidth part resource, is determined by using the first downlink control information. This increases selectivity of a cooperative time-frequency resource of the first user group.

In at least one embodiment, a configuration information receiving method is provided. The method is performed by a second terminal apparatus. The second terminal apparatus is alternatively a module or a chip in the second terminal apparatus. The second terminal apparatus is alternatively a chip or a system-on-a-chip. The method includes: The second terminal apparatus receives first configuration information from a first network apparatus, where the first configuration information is further sent to another terminal apparatus in a first user group, the first configuration information indicates at least one resource element, the first user group includes a first terminal apparatus and the second terminal apparatus, and the first terminal apparatus is configured to assist in information transmission between the first network apparatus and the second terminal apparatus. The second terminal apparatus receives first downlink control information from the first network apparatus, where the first downlink control information is further sent to the another terminal apparatus in the first user group, the first downlink control information indicates a first resource element in the at least one resource element and a first time-frequency resource, and the first time-frequency resource belongs to the first resource element. The second terminal apparatus transmits first information with the first network apparatus on the first time-frequency resource.

In at least one embodiment, the first network apparatus configures several resource elements for the first user group by using the first configuration information, and indicates the first resource element and the first time-frequency resource in the first resource element by using the first downlink control information. The first network apparatus configures a same first resource element and a same first time-frequency resource for the first user group including the first terminal apparatus and the second terminal apparatus, so that several terminal apparatuses in the first user group simultaneously communicate with the first network apparatus, a resource element is saved, and resource utilization is improved.

In at least one embodiment, the second terminal apparatus receives third configuration information from the first network apparatus, where the third configuration information indicates at least one resource element used for communication between the second terminal apparatus and the first network apparatus. The second terminal apparatus receives third downlink control information from the first network apparatus, where the third downlink control information indicates a third resource element in the at least one resource element and a third time-frequency resource, and the third time-frequency resource belongs to the third resource element.

In at least one embodiment, the first network apparatus sends second configuration information to the first terminal apparatus to configure several resource elements for the first terminal apparatus, and indicates a second resource element and determines a second time-frequency resource in the second resource element by sending second downlink control information, to configure, for the first terminal apparatus, the resource element and the time-frequency resource that are used for communication between the first terminal apparatus and the first network apparatus. Likewise, the resource element and the time-frequency resource that are used for communication between the second terminal apparatus and the first network apparatus are also configured for the second terminal apparatus. A resource element and a time-frequency resource that are used for communication between a terminal apparatus and the first network apparatus are configured based on a service requirement and a capability of the terminal apparatus, so that resource configuration flexibility is improved.

In at least one embodiment, the first configuration information and the first downlink control information are scrambled by using a group identifier corresponding to the first user group.

In at least one embodiment, the first network apparatus sends one piece of configuration information and one piece of control information that are scrambled by using the group identifier, to configure a same resource element and a same time-frequency resource for terminal apparatuses in the first user group. The terminal apparatuses in the first user group determine, by identifying the group identifier for scrambling, that the configuration information is sent to the terminal apparatuses. Therefore, a sending manner of multicast or broadcast scrambled by using the group identifier effectively reduces resource overheads of downlink control signaling.

In at least one embodiment, second information sent by the first terminal apparatus to the first network apparatus indicates that the first terminal apparatus is configured to assist in the information transmission between the first network apparatus and the second terminal apparatus. The second terminal apparatus receives fourth downlink control information from the first network apparatus, where the fourth downlink control information indicates that the first terminal apparatus and the second terminal apparatus belong to the first user group, and the fourth downlink control information is further used to indicate a group identifier corresponding to the first user group.

In at least one embodiment, the first network apparatus determines, by using the second information, that the first terminal apparatus is configured to assist in communication between the first network apparatus and the second terminal apparatus, and sends the fourth downlink control message to the first terminal apparatus and the second terminal apparatus, to notify the first terminal apparatus and the second terminal apparatus that the first terminal apparatus and the second terminal apparatus belong to the first user group and notify the first terminal apparatus and the second terminal apparatus of the group identifier of the first user group. To correctly receiving and decoding configuration information and downlink control information by a terminal apparatus, the first terminal apparatus and the second terminal apparatus determine that the first terminal apparatus and the second terminal apparatus belong to the first user group and obtain the group identifier of the user group.

In at least one embodiment, a first control resource set belongs to the first resource element, the first control resource set sends fifth downlink control information, the fifth downlink control information indicates a fourth time-frequency resource, and the fourth time-frequency resource belongs to the first resource element. The second terminal apparatus transmits third information with the first network apparatus on the fourth time-frequency resource.

In at least one embodiment, the first user group receives the fifth control information in the first control resource set in the first resource element. The fifth downlink control information indicates the fourth time-frequency resource in the first resource element. The fourth time-frequency resource transmits the third information between the first user group and the first network apparatus. The fourth time-frequency resource and the first time-frequency resource are different time-frequency resources, which increases flexibility of using a time-frequency resource for communication between the first user group and the first network apparatus.

In at least one embodiment, the third configuration information and the third downlink control information are scrambled by using a user identifier corresponding to the second terminal apparatus.

In at least one embodiment, a terminal apparatus receives configuration information and downlink control information by using a user identifier of the terminal apparatus, and determines, through scrambling performed by using the user identifier of the terminal user, the resource element and the time-frequency resource used for the communication between the terminal and the first network apparatus. In this way, the resources are configured based on the service requirement and the capability of the terminal apparatus, so that the resource configuration flexibility is improved.

In at least one embodiment, the at least one resource element includes at least one bandwidth part resource.

In at least one embodiment, the at least one resource element configured by the first network apparatus for the first user group by using the first configuration information actually includes one or more bandwidth part resources. Subsequently, the first resource element, namely, an active bandwidth part resource, is determined by using the first downlink control information. This increases selectivity of a cooperative time-frequency resource of the first user group.

In at least one embodiment, a first network apparatus is provided. Beneficial effects are described in at least one embodiment herein. Details are not described herein again. The apparatus is the first network apparatus, is a chip or a module in the first network apparatus, or is a chip or a system-on-a-chip. The apparatus includes a transceiver unit, configured to send first configuration information to a first user group, where the first configuration information indicates at least one resource element, the first user group includes a first terminal apparatus and a second terminal apparatus, and the first terminal apparatus is configured to assist in information transmission between the first network apparatus and the second terminal apparatus. The transceiver unit is further configured to send first downlink control information to the first user group, where the first downlink control information indicates a first resource element in the at least one resource element and a first time-frequency resource, and the first time-frequency resource belongs to the first resource element. The transceiver unit is further configured to transmit first information with the first terminal apparatus and the second terminal apparatus on the first time-frequency resource.

In at least one embodiment, the transceiver unit is further configured to send second configuration information to the first terminal apparatus, where the second configuration information indicates at least one resource element used for communication between the first terminal apparatus and the first network apparatus. The transceiver unit is further configured to send second downlink control information to the first terminal apparatus, where the second downlink control information indicates a second resource element in the at least one resource element and a second time-frequency resource, and the second time-frequency resource belongs to the second resource element. The transceiver unit is further configured to communicate with the first terminal apparatus on the second time-frequency resource. The transceiver unit is further configured to send third configuration information to the second terminal apparatus, where the third configuration information indicates at least one resource element used for communication between the second terminal apparatus and the first network apparatus. The transceiver unit is further configured to send third downlink control information to the second terminal apparatus, where the third downlink control information indicates a third resource element in the at least one resource element and a third time-frequency resource, and the third time-frequency resource belongs to the third resource element. The transceiver unit is further configured to communicate with the second terminal apparatus on the third time-frequency resource.

In at least one embodiment, the first configuration information and the first downlink control information are scrambled by using a group identifier corresponding to the first user group.

In at least one embodiment, a processing unit is configured to determine, based on second information from the first terminal apparatus, that the first terminal apparatus is configured to assist in the information transmission between the first network apparatus and the second terminal apparatus. The transceiver unit is further configured to send fourth downlink control information to the first terminal apparatus and the second terminal apparatus, where the fourth downlink control information indicates that the first terminal apparatus and the second terminal apparatus belong to the first user group, and the fourth downlink control information is further used to indicate a group identifier corresponding to the first user group.

In at least one embodiment, a first control resource set belongs to the first resource element, the first control resource set sends fifth downlink control information, the fifth downlink control information indicates a fourth time-frequency resource, and the fourth time-frequency resource belongs to the first resource element. The transceiver unit is further configured to transmit third information with the first terminal apparatus and the second terminal apparatus on the fourth time-frequency resource.

In at least one embodiment, the second configuration information and the second downlink control information are scrambled by using a user identifier corresponding to the first terminal apparatus, and the third configuration information and the third downlink control information are scrambled by using a user identifier corresponding to the second terminal apparatus.

In at least one embodiment, the at least one resource element includes at least one bandwidth part resource.

In at least one embodiment, a first terminal apparatus is provided. Beneficial effects are described in at least one embodiment herein. Details are not described herein again. The apparatus is the first terminal apparatus, is a chip or a module in the first terminal apparatus, or is a chip or a system-on-a-chip. The apparatus includes a transceiver unit, configured to receive first configuration information from a first network apparatus, where the first configuration information is further sent to another terminal apparatus in a first user group, the first configuration information indicates at least one resource element, the first user group includes the first terminal apparatus and a second terminal apparatus, and the first terminal apparatus assists in information transmission between the first network apparatus and the second terminal apparatus. The transceiver unit is further configured to receive first downlink control information from the first network apparatus, where the first downlink control information is further sent to the another terminal apparatus in the first user group, the first downlink control information indicates a first resource element in the at least one resource element and a first time-frequency resource, and the first time-frequency resource belongs to the first resource element. The transceiver unit is further configured to transmit first information with the first network apparatus on the first time-frequency resource.

In at least one embodiment, the transceiver unit is further configured to receive second configuration information from the first network apparatus, where the second configuration information indicates at least one resource element used for communication between the first terminal apparatus and the first network apparatus. The transceiver unit is further configured to receive second downlink control information from the first network apparatus, where the second downlink control information indicates a second resource element in the at least one resource element and a second time-frequency resource, and the second time-frequency resource belongs to the second resource element. The transceiver unit is further configured to communicate with the first terminal apparatus on the second time-frequency resource.

In at least one embodiment, the first configuration information and the first downlink control information are scrambled by using a group identifier corresponding to the first user group.

In at least one embodiment, the transceiver unit is further configured to send second information to the first network apparatus, where the second information indicates that the first terminal apparatus is configured to assist in the information transmission between the first network apparatus and the second terminal apparatus. The transceiver unit is further configured to receive fourth downlink control information from the first network apparatus, where the fourth downlink control information indicates that the first terminal apparatus and the second terminal apparatus belong to the first user group, and the fourth downlink control information is further used to indicate a group identifier corresponding to the first user group.

In at least one embodiment, a first control resource set belongs to the first resource element, the first control resource set sends fifth downlink control information, the fifth downlink control information indicates a fourth time-frequency resource, and the fourth time-frequency resource belongs to the first resource element. The transceiver unit is further configured to transmit third information with the first network apparatus on the fourth time-frequency resource.

In at least one embodiment, the second configuration information and the second downlink control information are scrambled by using a user identifier corresponding to the first terminal apparatus.

In at least one embodiment, the at least one resource element includes at least one bandwidth part resource.

In at least one embodiment, a second terminal apparatus is described herein. Beneficial effects are described in at least one embodiment herein. Details are not described herein again. The apparatus is the second terminal apparatus, is a chip or a module in the second terminal apparatus, or is a chip or a system-on-a-chip. The apparatus includes: a transceiver unit, configured to receive first configuration information from a first network apparatus, where the first configuration information is further sent to another terminal apparatus in a first user group, the first configuration information indicates at least one resource element, the first user group includes a first terminal apparatus and the second terminal apparatus, and the first terminal apparatus assists in information transmission between the first network apparatus and the second terminal apparatus. The transceiver unit is further configured to receive first downlink control information from the first network apparatus, where the first downlink control information is further sent to the another terminal apparatus in the first user group, the first downlink control information indicates a first resource element in the at least one resource element and a first time-frequency resource, and the first time-frequency resource belongs to the first resource element. The transceiver unit is further configured to transmit first information with the first network apparatus on the first time-frequency resource.

In at least one embodiment, the transceiver unit is further configured to receive third configuration information from the first network apparatus, where the third configuration information indicates at least one resource element used for communication between the first terminal apparatus and the first network apparatus. The transceiver unit is further configured to receive third downlink control information from the first network apparatus, where the third downlink control information indicates a third resource element in the at least one resource element and a third time-frequency resource, and the third time-frequency resource belongs to the third resource element. The transceiver unit is further configured to communicate with the first terminal apparatus on the third time-frequency resource.

In at least one embodiment, the first configuration information and the first downlink control information are scrambled by using a group identifier corresponding to the first user group.

In at least one embodiment, the transceiver unit is further configured to send second information to the first network apparatus, where the second information indicates that the first terminal apparatus is configured to assist in the information transmission between the first network apparatus and the second terminal apparatus. The transceiver unit is further configured to receive fourth downlink control information from the first network apparatus, where the fourth downlink control information indicates that the first terminal apparatus and the second terminal apparatus belong to the first user group, and the fourth downlink control information is further used to indicate a group identifier corresponding to the first user group.

In at least one embodiment, a first control resource set belongs to the first resource element, the first control resource set sends fifth downlink control information, the fifth downlink control information indicates a fourth time-frequency resource, and the fourth time-frequency resource belongs to the first resource element. The transceiver unit is further configured to transmit third information with the first network apparatus on the fourth time-frequency resource.

In at least one embodiment, the third configuration information and the third downlink control information are scrambled by using a user identifier corresponding to the first terminal apparatus.

In at least one embodiment, the at least one resource element includes at least one bandwidth part resource.

In at least one embodiment, a computer-readable storage medium or a non-volatile storage medium is described herein. The computer-readable storage medium or the non-volatile storage medium stores instructions or a program. In response to the instructions or the program being run on a computer, the computer is enabled to perform the methods described herein in at least one embodiment. In response to the instructions or the program being run on one or more processors, a communication apparatus including the one or more processors is enabled to perform the methods described herein in at least one embodiment.

In at least one embodiment, a computer program product is described herein. The computer program product is configured to store a computer program. In response to the computer program being run on a computer, the computer is enabled to perform the method described herein in at least one embodiment.

In at least one embodiment, a chip or an indication information transmission apparatus is described herein, including at least one processor. The at least one processor is coupled to a memory. The memory includes instructions. The at least one processor runs the instructions to enable the apparatus configured to transmit a common signal to perform the method described herein in at least one embodiment.

In at least one embodiment, a communication apparatus is described herein. The communication apparatus includes one or more processors and one or more memories or non-volatile storage media. The one or more memories or non-volatile storage media store instructions or a program. In response to the one or more processors executing the instructions or the program, the communication apparatus or the one or more processors are enabled to perform the methods described herein in at least one embodiment.

In at least one embodiment, a terminal apparatus or a communication apparatus is described herein, and is configured to perform the method described herein in at least one embodiment.

In at least one embodiment, a network apparatus or a communication apparatus is described herein, and is configured to perform the method described herein in at least one embodiment.

In at least one embodiment, a system is described herein. The system includes the first terminal apparatus, the second terminal apparatus, and the first network apparatus described herein in the at least one embodiment.

DESCRIPTION OF EMBODIMENTS

Figure 1:
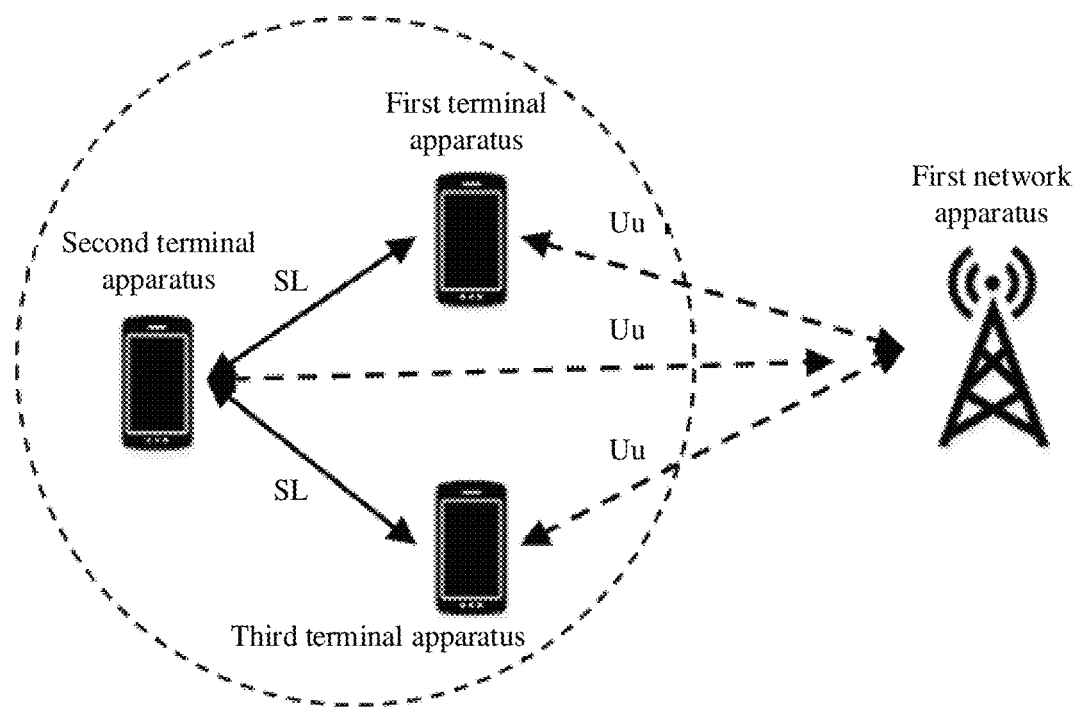
FIG. 1 is a schematic diagram of an architecture of a system according to at least one embodiment.

FIG. 1 is a schematic diagram according to at least one embodiment. As shown in FIG. 1, a plurality of terminal apparatuses and a network apparatus are described. In an example, the terminal device is a mobile terminal, and the network device is an access network device. As shown in FIG. 1, the network apparatus communicates with the plurality of terminal apparatuses through uplinks and downlinks. A user cooperation group includes the plurality of terminal apparatuses. Terminal apparatuses in one cooperation group also communicates with each other. The network apparatus sends information to the user cooperation group. A first terminal apparatus and a second terminal apparatus receive the information through Uu interface links. In addition, the second terminal apparatus further communicates with the first terminal apparatus through a sidelink (Sidelink, SL). The second terminal apparatus transmits information to the first terminal apparatus and/or a third terminal apparatus through sidelinks/a sidelink. The first terminal apparatus and the third terminal apparatus transmit, to the first network apparatus, the information from the second terminal apparatus, to complete transmission cooperation with the second terminal apparatus. In an uplink transmission scenario, the second terminal apparatus is a source target equipment (Source User Equipment, SUE), the first terminal apparatus is a cooperative user equipment 1 (Cooperative User Equipment, CUE1), and the third terminal apparatus is a cooperative user equipment 2, namely, a CUE 2. In a downlink cooperation transmission scenario, the second terminal apparatus is a target user equipment (Target User Equipment, TUE). FIG. 1 shows two cooperative terminal apparatuses. In an actual scenario, there are more than two cooperative terminal apparatuses, and there are also a plurality of source terminal apparatuses. Specifically, uplink transmission based on user cooperation mainly includes two phases. In the first phase, the source user equipment sends data to the cooperative user equipment, namely, the CUE 1 and the CUE 2 in the figure, through the sidelinks. The sidelink herein is a link used for communication between terminals. In the second phase, the CUE 1 and the CUE 2 forward correctly received signals to a base station through uplink Uu links. There are different forwarding manners, for example, amplify-and-forward, decode-and-forward, and compress-and-forward. The uplink Uu link herein refers to a universal UE network interface used by a terminal to send information to the network device. For transmission in the second phase, the SUE alternatively sends information to a base station through an uplink Uu link. This is not limited herein. In this way, the SUE implements reliable transmission of data with help of the CUE 1 and the CUE 2, to improve uplink coverage and system transmission efficiency. Downlink transmission based on the user cooperation also mainly includes two phases. In the first phase, the network device sends information to the cooperative user equipment (Cooperative User Equipment, CUE), namely, the CUE 1 and the CUE 2 in the figure, through downlink Uu links. In the second phase, the CUE 1 and the CUE 2 forward correctly received signals to a target user equipment (Target User Equipment, TUE) through the sidelinks (there are different forwarding manners, for example, amplify-and-forward, decode-and-forward, and compress-and-forward). For transmission in the first phase, the network device alternatively sends information to a target user equipment (Target User Equipment, TUE) through a downlink Uu link. This is not limited herein. In this way, the SUE or the TUE implements reliable transmission of data with help of the CUE 1 and the CUE 2, to improve uplink coverage and system transmission efficiency. A user equipment (User Equipment, UE is an SUE/a TUE in a user cooperation group centered on the user equipment, or is a CUE in one or more other user cooperation groups. There are a plurality of different user cooperation groups in a same cell. For UE cooperation transmission, in response to a plurality of potential CUEs being around the SUE/TUE, a network side or the SUE/TUE selects one or more of the plurality of potential CUEs as a CUE. At least one embodiment is applicable to UE cooperation, and in at least one embodiment is also applicable to user equipment relay (UE relay).

The following explains and describes some terms in at least one embodiment, to facilitate understanding of a person skilled in the art.

(1) Terminal apparatus: The first terminal apparatus or the second terminal apparatus in at least one embodiment includes various devices having a wireless communication function or units, components, modules, apparatuses, chips, or SOCs in the devices. The device having the wireless communication function is, for example, a vehicle-mounted device, a wearable device, a computing device or another device connected to a wireless modem, a mobile station (Mobile station, MS), a terminal (terminal), or a user equipment (User Equipment, UE). In response to the first terminal apparatus and the second terminal apparatus being vehicle-mounted devices, the first terminal apparatus and the second terminal apparatus are placed or installed in a vehicle. The vehicle-mounted device is considered as a part of the vehicle, or is considered as a module or a module disposed in the vehicle. The vehicle-mounted terminal apparatus is also referred to as an on board unit (On Board Unit, OBU).

The first terminal apparatus or the second terminal apparatus in at least one embodiment further includes a device that provides a voice and/or data connectivity for a user.

Specifically, the first terminal apparatus or the second terminal apparatus includes a device that provides the voice for the user, includes a device that provides the data connectivity for the user, or includes a device that provides the voice and the data connectivity for the user. For example, the first terminal apparatus or the second terminal apparatus includes a handheld device having a wireless connection function or a processing device connected to the wireless modem. The terminal device communicates with a core network through a radio access network (radio access network, RAN), and exchange a voice or data with the RAN, or exchange the voice and the data with the RAN. The terminal apparatus includes a user equipment (user equipment, UE), a wireless terminal device, a mobile terminal device, a device-to-device (device-to-device, D2D) communication terminal device, a vehicle to everything (vehicle to everything, V2X) terminal device, a machine-to-machine/machine type communication (machine-to-machine/machine-type communications, M2M/MTC) terminal device, an internet of things (internet of things, IoT) terminal device, a subscriber unit (subscriber unit), a subscriber station (subscriber station), a mobile station (mobile station), a remote station (remote station), an access point (access point, AP), a remote terminal (remote terminal), an access terminal (access terminal), a user terminal (user terminal), a user agent (user agent), a user device (user device), or the like. For example, the terminal apparatus includes a mobile phone (or referred to as a "cellular" phone), a computer with a mobile terminal device, or a portable, pocket-sized, handheld, or computer built-in mobile apparatus. For example, the terminal apparatus is a device such as a personal communications service (personal communication service, PCS) phone, a cordless phone, a session initiation protocol (session initiation protocol, SIP) phone set, a wireless local loop (wireless local loop, WLL) station, or a personal digital assistant (personal digital assistant, PDA). The terminal apparatus further includes a limited device, for example, a device having low power consumption, a device having a limited storage capability, or a device having a limited computing capability. For example, the terminal apparatus includes an information sensing device such as a barcode, radio frequency identification (radio frequency identification, RFID), a sensor, a global positioning system (global positioning system, GPS), or a laser scanner.

By way of example but not limitation, the first terminal apparatus or the second terminal apparatus in at least one embodiment is alternatively a wearable device. The wearable device is also referred to as a wearable intelligent device, an intelligent wearable device, or the like, and is a generic term for wearable devices that are developed by applying wearable technologies to intelligent designs of daily wear, such as glasses, gloves, watches, clothes, and shoes. The wearable device is directly worn, or is a portable device integrated into clothes or an accessory of the user. The wearable device is a hardware device, and also implements a powerful function through software support, data exchange, and cloud interaction. In a broad sense, wearable intelligent devices include full-featured and large-sized devices that implement all or some functions without depending on smartphones, for example, smart watches or smart glasses, and include devices that perform one type of function and collaboratively work with other devices such as smartphones, for example, various smart bands, smart helmets, or smart jewelry for monitoring physical signs.

The terminal apparatus is a terminal device, or is a module configured to implement a function of the terminal device. The module is disposed in the terminal device, or is disposed independently of the terminal device. The module is, for example, a chip, a chip system, or a system-on-a-chip.

(2) A network apparatus includes, for example, an access network (access network, AN) device such as a base station (for example, an access point), and is a device that communicates with a wireless terminal device through an air interface by using one or more cells in an access network. Alternatively, for example, a network device in a vehicle-to-everything (vehicle-to-everything, V2X) technology is a road side unit (road side unit, RSU). The base station is configured to perform mutual conversion between a received over-the-air frame and an IP packet, to serve as a router between the terminal device and a remaining part of the access network, where the remaining part of the access network includes an IP network. The RSU is a fixed infrastructure entity supporting a V2X application, and exchanges messages with another entity supporting the V2X application. The network device further coordinates attribute management of the air interface. For example, the network apparatus includes an evolved NodeB (NodeB or eNB or eNodeB, evolved NodeB) in a long term evolution (long term evolution, LTE) system or long term evolution-advanced (long term evolution-advanced, LTE-A), includes a next generation NodeB (next generation NodeB, gNB) in a $5^{th}$-generation mobile communication technology (the $5^{th}$ generation, 5G) new radio (new radio, NR) system (also briefly referred to as an NR system), or includes a centralized unit (centralized unit, CU) and a distributed unit (distributed unit, DU) in a cloud radio access network (cloud radio access network, Cloud RAN) system. This is not limited in at least one embodiment.

(4) A sidelink (sidelink) is a link between terminal apparatuses. An uplink is a link through which the terminal apparatus sends information to the network apparatus, and a downlink is a link through which the terminal apparatus receives information from the network apparatus.

(5) Terms "system" and "network" is used interchangeably at least one embodiment. "At least one" means one or more, and "a plurality of" means two or more. The term "and/or" describes an association relationship between associated objects, and represents that three relationships exist. For example, A and/or B represents the following three cases: Only A exists, both A and B exist, and only B exists. A and B is singular or plural. The character "/" usually indicates an "or" relationship between the associated objects. "At least one of the following" or a similar expression thereof means any combination of these items, and includes a singular item or any combination of plural items. For example, at least one of a, b, or c indicates a, b, c, a and b, a and c, b and c, or a, b, and c, where a, b, and c each is singular or plural.

In addition, unless otherwise stated, in at least one embodiment, ordinal numbers such as "first" and "second" are intended to distinguish between a plurality of objects, and not intended to limit an order, a time sequence, a priority, or importance of the plurality of objects. For example, a first power control factor and a second power control factor are merely used to distinguish between different power control factors, and do not necessarily indicate a difference between content, priorities, importance, or the like of the two power control factors.

The following describes at least one embodiment in more detail by using a first terminal apparatus, a second terminal apparatus, and a first network apparatus as an example with reference to specific examples.

Figure 2:
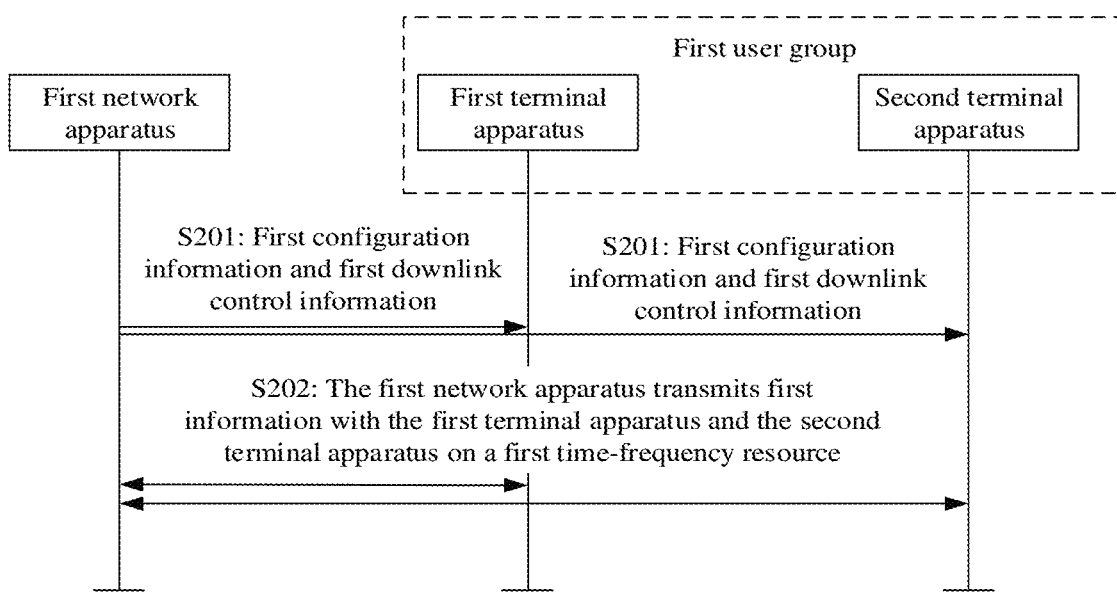
FIG. 2 shows a configuration information sending method, a first terminal apparatus, a second terminal apparatus, a first network apparatus, and a system according to at least one embodiment.

FIG. 2 shows a configuration information sending method, the first terminal apparatus, the second terminal apparatus, and the first network apparatus that perform the configuration information sending method, and a system including the first terminal apparatus, the second terminal apparatus, and the first network apparatus according to at least one embodiment.

Figure 7:
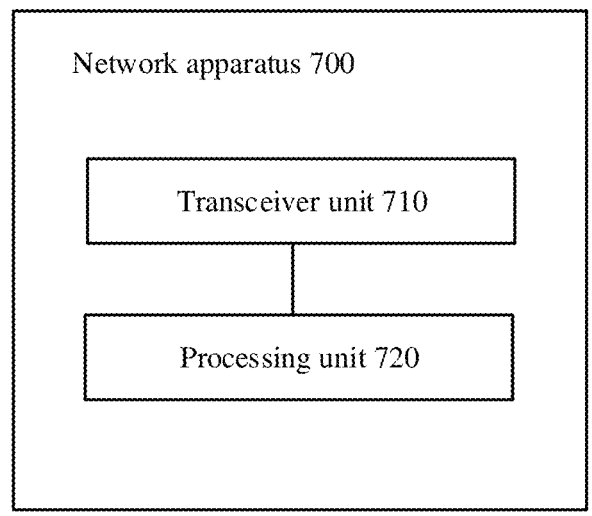
FIG. 7 shows a first network apparatus according to at least one embodiment.
Figure 8:
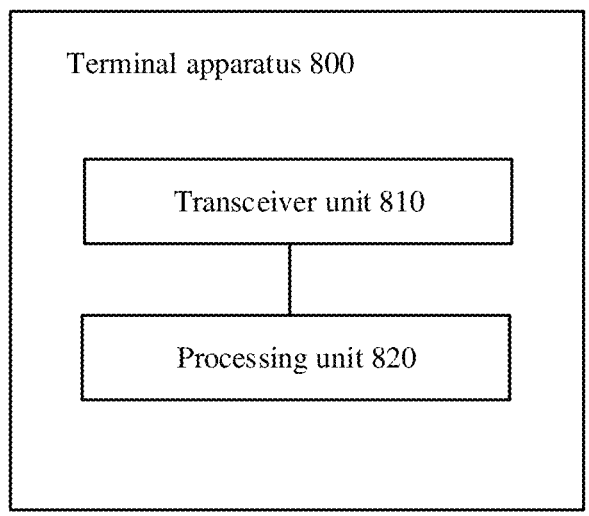
FIG. 8 shows a first terminal apparatus according to at least one embodiment.
Figure 9:
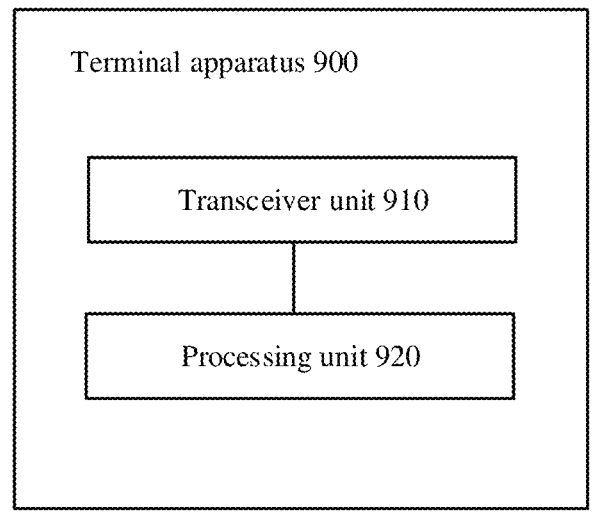
FIG. 9 shows a second terminal apparatus according to at least one embodiment.

As shown in FIG. 7, the first network apparatus 700 includes a transceiver unit 710 and a processing unit 720. As shown in FIG. 8, the first terminal apparatus 800 includes a transceiver unit 810 and a processing unit 820. As shown in FIG. 9, the second terminal apparatus 900 includes a transceiver unit 910, and the second terminal apparatus further includes a processing unit 920.

In response to the first terminal apparatus or the second terminal apparatus being a terminal device or a user equipment, and the network apparatus being a network device or a base station, the transceiver unit 710, the transceiver unit 810, and the transceiver unit 910 area sending unit or a transmitter that send information, the transceiver unit 710, the transceiver unit 810, and the transceiver unit 910 are a receiving unit or a receiver that receives information, and the transceiver unit is a transceiver, where the transceiver, the transmitter, or the receiver is a radio frequency circuit. In response to the first terminal apparatus or the second terminal apparatus including a storage unit, the storage unit is configured to store computer instructions, the processor is communicatively connected to the memory, and the processor executes the computer instructions stored in the memory, so that the first terminal apparatus, the second terminal apparatus, and the first network apparatus perform the method in the embodiment in FIG. 2. The processor is a general-purpose central processing unit (CPU), a microprocessor, or an application specific integrated circuit (Application Specific Integrated Circuit, ASIC).

In response to the first terminal apparatus, the second terminal apparatus, or the first network device being a chip, the transceiver unit 710, the transceiver unit 910, and the transceiver unit 820 are an output interface, a pin, a circuit, or the like. The processing unit executes computer-executable instructions stored in a storage unit, so that a chip in the first terminal apparatus, the second terminal apparatus, or the first network apparatus performs the method in FIG. 2. In at least one embodiment, the storage unit is a storage unit in the chip, for example, a register or a cache, or the storage unit is a storage unit in the terminal but outside the chip, for example, a read-only memory (Read Only Memory, ROM), another type of static storage device capable of storing static information and instructions, or a random access memory (Random Access Memory, RAM).

Specific steps of a data transmission method in the embodiment in FIG. 2 are as follows.

Step S201: The transceiver unit 710 in the first network apparatus sends first configuration information to a first user group. The transceiver unit 810 in the first terminal apparatus and the transceiver unit 910 in the second terminal apparatus receive the first configuration information from the first network apparatus. The first configuration information indicates at least one resource element. The first user group includes the first terminal apparatus and the second terminal apparatus. The first terminal apparatus is configured to assist in information transmission between the first network apparatus and the second terminal apparatus. The first network apparatus sends first downlink control information to the first user group. The transceiver unit 810 in the first terminal apparatus and the transceiver unit 910 in the second terminal apparatus receive the first downlink control information from the first network apparatus. The first downlink control information indicates a first resource element in the at least one resource element and a first time-frequency resource. The first time-frequency resource belongs to the first resource element.

Step S202: The first network apparatus transmits first information with the first terminal apparatus and the second terminal apparatus on the first time-frequency resource. In at least one embodiment, the first time-frequency resource is used by the first network apparatus to send information to the first terminal apparatus and the second terminal apparatus, or the first time-frequency resource is used by the first network apparatus to receive information from the first terminal apparatus and the second terminal apparatus. In an uplink cooperation scenario, in response to the first terminal apparatus serving as a CUE, and the second terminal apparatus serving as an SUE, the second terminal apparatus sends, to the first terminal apparatus through a sidelink, the first information on which cooperation transmission is performed, the first terminal apparatus and the second terminal apparatus send the first information to the first network apparatus on the first time-frequency resource, and the first network apparatus receives the first information from the first terminal apparatus and the second terminal apparatus, so that a probability of successfully receiving the first information is improved. In a downlink cooperation scenario, in response to the second terminal apparatus serving as a TUE, the first network apparatus transmits the first information to the first user group on the first time-frequency resource, a CUE and the TUE receive the first information, and the CUE further forwards the received first information to the TUE on the sidelink, so that a probability of correctly receiving the first information by the TUE is improved.

In step S201, the first network apparatus sends the first configuration information by using a system message or radio resource control (Radio Resource Control, RRC) common information. For example, an access network device sends the system information or the RRC common information to a terminal. The system information or the common RRC information is a cell-level parameter. A link resource is configured for a group of terminals by using the system information or the RRC common information. During specific implementation, the access network device sends the system information or the RRC common information to the group of terminals. The system information or the RRC common information is used to configure the link resource for the terminals. Because the system information or the RRC common information is sent to the group of terminals, the link resource configured by using the system information or the RRC common information is used for multicast transmission between a base station and the terminals in the group. For example, the base station multicasts data and/or control information by using the link resource configured by using the system information or the RRC common information. In this case, the terminals in the group receives the data or the control information on the link resource. The group of terminals is one or more terminals that receive the system information or the RRC common information. For example, a cell divides terminals served by the cell into a plurality of groups, and the group of terminals is one of the plurality of groups. The link resource configured by using the system information or the RRC common information is further used for unicast transmission and/or broadcast transmission. This is not limited herein.

In step S201, the at least one resource element includes at least one bandwidth part resource. A bandwidth part is a segment of consecutive frequency domain resources. The bandwidth part is also referred to as a carrier bandwidth part (carrier BWP). In a serving cell, the base station configures four BWPs for one UE. A BWP is activated for the UE simultaneously. The UE sends and receives data on the active BWP. The first network apparatus configures the at least one resource element for the first user group to be simultaneously used by terminal apparatuses in the first user group. Subsequently, the first resource element, namely, an active bandwidth part resource determined by the first network apparatus, is determined by using the first downlink control information. A plurality of optional bandwidth part resources are configured for the first user group, so that selectivity of a cooperative time-frequency resource of the first user group is increased. According to at least one embodiment, the at least one resource element configured by the first network apparatus for the first user group by using the first configuration information actually includes one or more bandwidth part resources. Subsequently, the first resource element, namely, the active bandwidth part resource, is determined by using the first downlink control information. This increases the selectivity of the cooperative time-frequency resource of the first user group.

The first user group includes the first terminal apparatus and the second terminal apparatus, and the first user group further include a third terminal apparatus or another terminal apparatus. This is not limited herein.

In step S201, first downlink control information indicates the first resource element in the at least one resource element and the first time-frequency resource, and the first time-frequency resource belongs to the first resource element. The first network apparatus sends the first downlink control information to the first user group, where the first downlink control information indicates the active first resource element and a part, namely, the first time-frequency resource, in the first resource element. In at least one embodiment, the resource element is a bandwidth part resource (BWP resource). A terminal apparatus in the first user group determines the first resource element, that is, determines the active BWP resource, and communicates with the first network apparatus on the active BWP resource. The first downlink control information further indicates the first time-frequency resource, and the first time-frequency resource belongs to the first resource element, that is, belongs to the active BWP resource. In at least one embodiment, the first downlink control information is sent through a physical downlink control channel (Physical Downlink Control Channel, PDCCH).

In step S201, the first network apparatus further respectively indicates the first resource element and the first time-frequency resource in the first resource element by using two pieces of downlink control information. For example, a network apparatus sends configuration information to a user group, where the configuration information indicates at least one resource element, and the user group includes a first terminal apparatus and a second terminal apparatus. The first terminal apparatus is configured to assist in information transmission between the first network apparatus and the second terminal apparatus. The network apparatus sends fifth downlink control information to the user group, where the fifth downlink control information indicates a first resource element in the at least one resource element. The network apparatus sends sixth downlink control information to the user group on the first resource element in the at least one resource element, where the sixth downlink control information indicates a first time-frequency resource, and the first time-frequency resource belongs to the first resource element. The sixth downlink control information is sent on a control resource set, and the control resource set belongs to the at least one resource element. The first network apparatus transmits first information with the first terminal apparatus and the second terminal apparatus on the first time-frequency resource, so that flexibility of an indication manner is improved.

In step S201, a first control resource set belongs to the first resource element, the first control resource set sends fifth downlink control information, the fifth downlink control information indicates a fourth time-frequency resource, and the fourth time-frequency resource belongs to the first resource element. The first network apparatus transmits third information with the first terminal apparatus and the second terminal apparatus on the fourth time-frequency resource. The first control resource set is a downlink control resource set. After the first network apparatus configures the at least one resource element for the first user group, and sends the first downlink control information to the first user group through the PDCCH to determine the active BWP, control information for data transmission between the first user group and the first network apparatus is delivered in the first control resource set. That is, after determining the active BWP used for cooperation, the first terminal apparatus receives downlink control information on a control resource set (Control Resource Set, CORESET) in the active BWP, and obtain, by using the downlink control information, time-frequency resources corresponding to data transmission for the second time and the third time. For example, the first network apparatus sends the first configuration information and the first downlink control information in a currently preconfigured BWP, and the terminal apparatuses in the first user group receive the first configuration information and the first downlink control information by using a CORESET, a PDCCH, or another channel such as a data channel in the currently preconfigured BWP, determine several BWPs by using the first configuration information, and obtain, by using the first downlink control information, the active BWP and the COREST and the first time-frequency resource that are in the active BWP. The first network apparatus transmits data with the first user group on the first time-frequency resource. During next time of data transmission, the first network apparatus delivers the fifth control information to the first user group on the CORESET in the active BWP, and the first user group receives the fifth downlink control information on the CORESET in the active BWP, where the fifth downlink control information indicates the fourth time-frequency resource. The fourth time-frequency resource and the first time-frequency resource is different time-frequency resources. That is, the first network apparatus selects, based on a characteristic of a data service in a time of cooperation transmission, time-frequency resources of different sizes for the first user group to use. According to at least one embodiment, the first user group receives the fifth control information in the first control resource set in the first resource element. The fifth downlink control information indicates the fourth time-frequency resource in the first resource element. The fourth time-frequency resource transmits the third information between the first user group and the first network apparatus. The fourth time-frequency resource and the first time-frequency resource are the different time-frequency resources, which increases flexibility of using a time-frequency resource for communication between the first user group and the first network apparatus.

Figure 4:
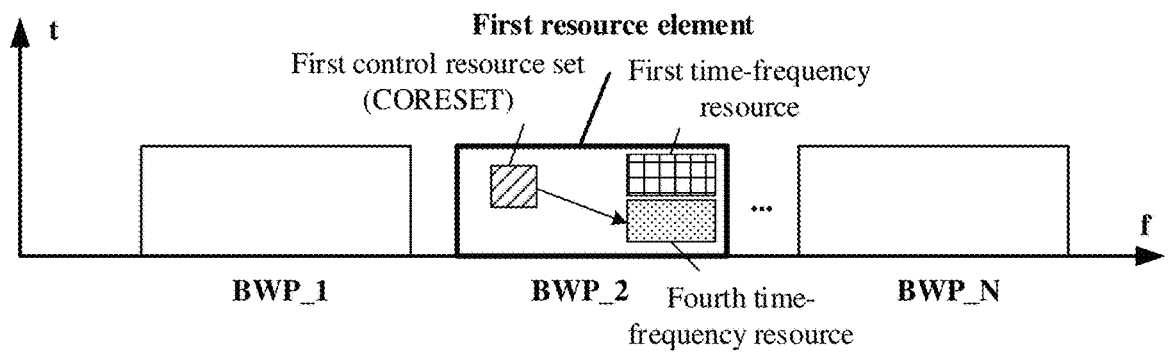
FIG. 4 is a schematic diagram of resource indication according to at least one embodiment.

FIG. 4 is a schematic diagram of a bandwidth part resource. The first network apparatus configures the at least one resource element for the first user group by using the first configuration information. The at least one resource element is a BWP resource pool. The BWP resource pool includes at least one BWP, and different BWPs occupy different frequency domain resources. For example, the first network apparatus configures N BWPs for the first user group by using the first configuration information, and the N BWPs are marked with BWP_1, BWP_2, ..., and BWP_N. The first network apparatus sends the first downlink control information to the first user group. The first downlink control information indicates the first resource element in the at least one resource element. For example, the first downlink control information indicates that BWP_2 in FIG. 4 is the first resource element, namely, the active BWP. In addition, the first downlink control information further indicates the first time-frequency resource in BWP_2. The first time-frequency resource is a part of BWP_2. That is, the first time-frequency resource is a time-frequency resource used for information transmission between the first user group and the first network apparatus. The first terminal apparatus and the second terminal apparatus send the information to the first network apparatus on the first time-frequency resource, and the first terminal apparatus and the second terminal apparatus further receive the information from the first network apparatus on the first time-frequency resource. The active BWP further includes the first control resource set CORESET. The first network apparatus sends the fifth downlink control information on the CORESET, where the fifth downlink control information indicates the fourth time-frequency resource. An arrow in FIG. 4 indicates the time-frequency resource indicated by the downlink control information in the CORESET. The first time-frequency resource and the fourth time-frequency resource are the same, or are different based on a service requirement.

The first configuration information and the first downlink control information are scrambled by using a group identifier corresponding to the first user group. That is, the first configuration information and the first downlink control information are scrambled by using a group ID of the first user group. Alternatively, the first configuration information and the first downlink control information carry a group identifier corresponding to the first user group, to notify a terminal apparatus in the first user group.

Figure 5:
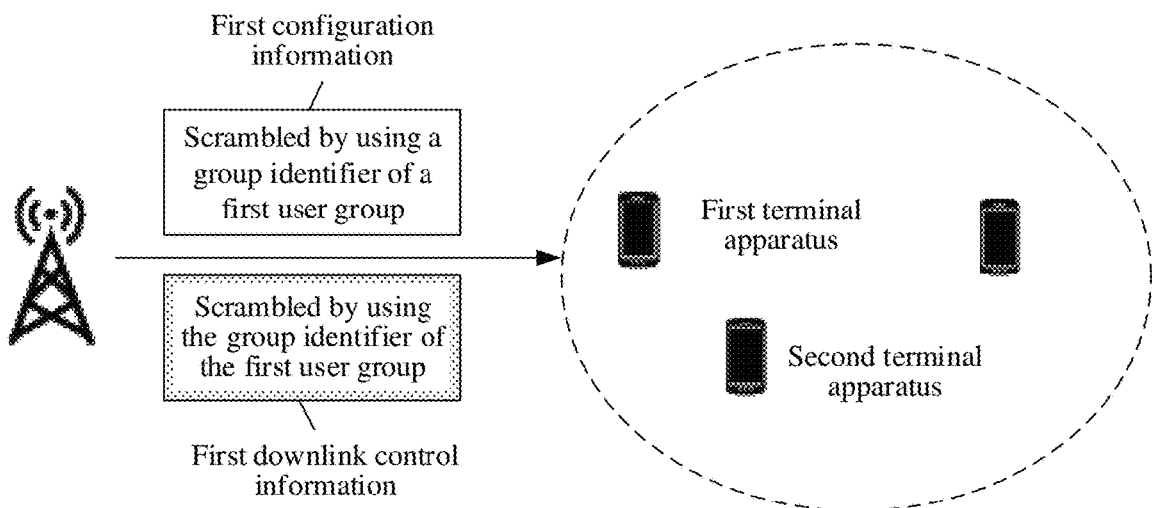
FIG. 5 is a schematic diagram of information indication according to at least one embodiment.

As shown in FIG. 5, user apparatuses, for example, the first terminal apparatus and the second terminal apparatus, in an ellipse belong to the first user group, and further include another terminal apparatus. The first network apparatus sends the first configuration information and the first downlink control information to the first user group. The first configuration information and the first downlink control information are scrambled by using a group identifier corresponding to the first user group. After receiving the configuration information and the control information, the terminal apparatuses in the first user group successfully decode the configuration information and the control information by using the group identifier, to obtain the first resource element and the first time-frequency resource. The first resource element and the first time-frequency resource are cooperation transmission resources that are of the first user group and that are configured by the network device. A CUE and an SUE/a TUE use the first time-frequency resource simultaneously, so that resource utilization efficiency is improved.

In at least one embodiment, the first network apparatus further respectively sends a plurality of pieces of configuration information and a plurality of pieces of downlink control information to the terminal apparatuses in the first user group, to configure the at least one resource element, the first resource element, and the first time-frequency resource in the first resource element.

For example, the first network apparatus sends one piece of configuration information to the first terminal apparatus. The configuration information is scrambled by using a user identifier corresponding to the first terminal apparatus, and the configuration information further includes an indicator bit used to indicate that the configuration information is used for cooperation transmission of the first user group, instead of being used for data transmission between the first terminal apparatus and the first network apparatus. The configuration information indicates at least one resource element to the first terminal apparatus. The first network apparatus sends downlink control information to the first terminal apparatus. The downlink control information is also scrambled by using the user identifier corresponding to the first terminal apparatus, and the downlink control information also includes an indicator bit used to indicate that the control information is used to configure a time-frequency resource used for cooperation transmission. The downlink control information indicates a specific resource element, namely, an active BWP, in the at least one resource element, and is further used to indicate a time-frequency resource and a CORESET resource that are in the active BWP. Likewise, UE-level configuration information and UE-level downlink control information are also sent to the second terminal apparatus, are scrambled by using a corresponding user identifier, and the UE-level configuration information and the UE-level downlink control information include an indicator bit to indicate that the first resource element and the first time-frequency resource are used for cooperation transmission.

Optionally, the configuration information is used to configure, by using RRC dedicated information, a cooperative BWP resource and a cooperative CORESET resource that are used for cooperative user transmission, where the cooperative BWP resource and the cooperative CORESET resource include a cooperative BWP resource and a cooperative CORESET resource that are used for uplink and downlink cooperation transmission. The downlink control information is used to configure, by using UE-specific downlink control signaling, an SUE/a TUE and a CUE to indicate, by using different indication signaling, a cooperative BWP resource and a cooperative time-frequency resource that are activated by the SUE/TUE and the CUE. An indicator bit is added to indicate that configuring performed by using the UE-specific downlink control signaling is configuring cooperative indication signaling. In addition, the SUE/TUE and the CUE are enabled to use a same cooperative BWP resource and a same cooperative time-frequency resource, or the SUE/TUE and the CUE use different cooperative time-frequency resources for transmission. This is not limited herein. For configuration information for which the UE-specific downlink control signaling is used, users in a cooperative user group including the SUE/TUE and the CUE are respectively configured through scrambling performed by using UE IDs. That the first network apparatus configures, by using the UE-specific downlink control signaling, the SUE/TUE and the CUE to use the different indication signaling usually means that different DCI is used. That is, for the SUE/TUE and the CUE, information indication bits, for example, active BWP indication bits and resource allocation (Resource Allocation, RA) indication bits, included in the DCI are the same, and indication bits, for example, DMRS indication bits and MCS/RV indication bits, included in the DCI are different, to reduce interference between the users and maximize a user transmission capability.

In at least one embodiment, the first network apparatus sends one piece of configuration information and one piece of control information that are scrambled by using the group identifier, to configure a same resource element and a same time-frequency resource for terminal apparatuses in the first user group. The terminal apparatuses in the first user group determine, by identifying the group identifier for scrambling, that the configuration information is sent to the terminal apparatuses. Therefore, a sending manner of multicast or broadcast scrambled by using the group identifier effectively reduces resource overheads of downlink control signaling. In at least one embodiment, the first network apparatus sends, to the terminal apparatuses in the first user group, configuration information and control information that are scrambled by using user identifiers corresponding to the terminal apparatuses, to configure a same resource element and a same time-frequency resource for the first user group, so that flexibility of a configuration manner is improved.

In at least one embodiment, the first network apparatus configures several resource elements for the first user group by using the first configuration information, and indicates the first resource element and the first time-frequency resource in the first resource element by using the first downlink control information. The first network apparatus configures a same first resource element and a same first time-frequency resource for the first user group including the first terminal apparatus and the second terminal apparatus, so that several terminal apparatuses in the first user group simultaneously communicate with the first network apparatus, a resource element is saved, and resource utilization is improved.

Figure 3:
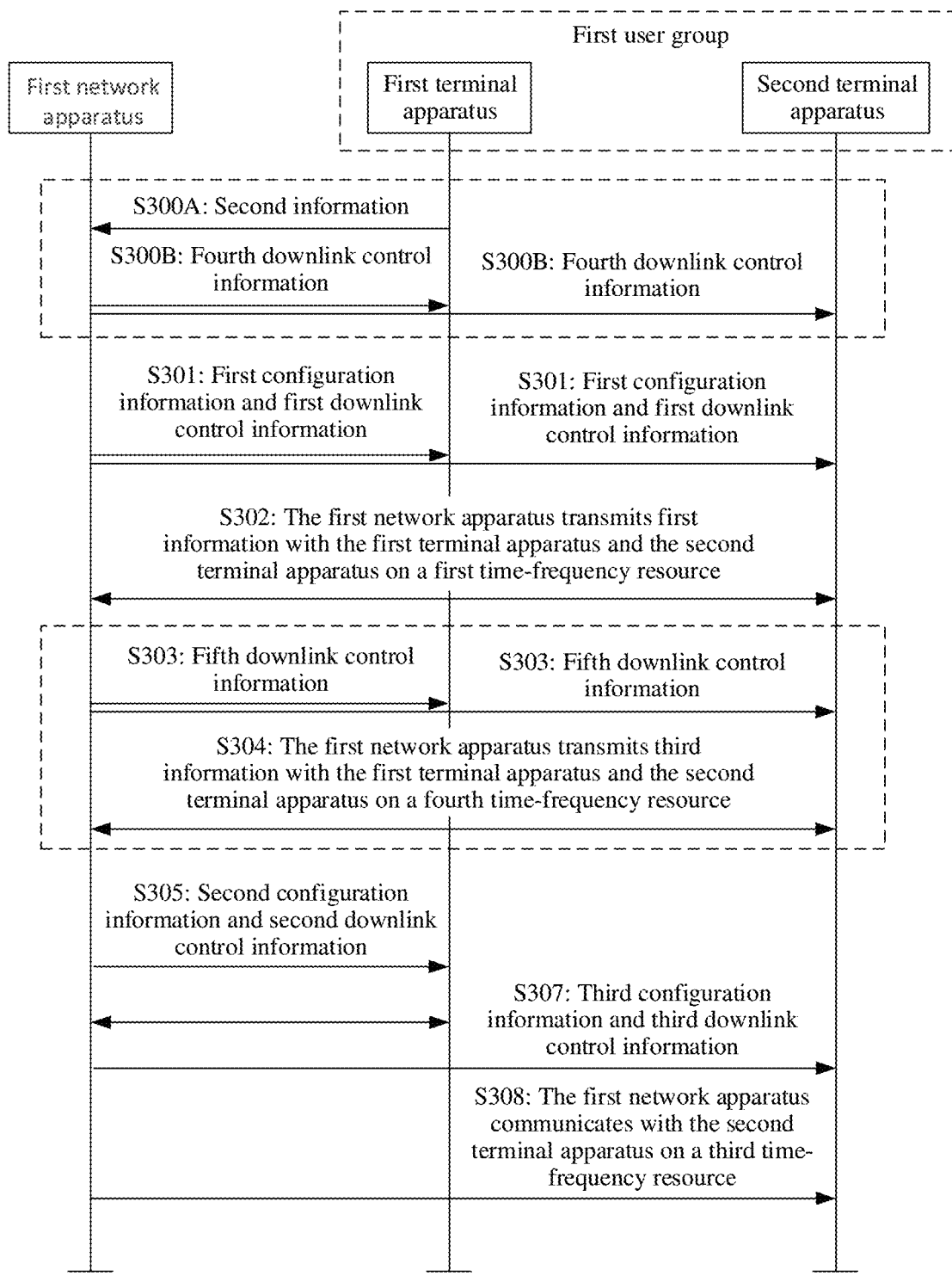
FIG. 3 is another flowchart of sending configuration information according to at least one embodiment.

FIG. 3 is a schematic flowchart according to at least one embodiment.

S300A: A transceiver unit 810 in the first terminal apparatus sends second information to the first network apparatus, and a transceiver unit 710 in the first network apparatus receives the second information from the first terminal apparatus. The first network apparatus determines, based on the second information, that the first terminal apparatus is configured to assist in information transmission between the first network apparatus and second terminal apparatus.

S300B: The transceiver unit 710 in the first network apparatus sends fourth downlink control information to the first terminal apparatus and the second terminal apparatus, and the transceiver unit 810 in the first terminal apparatus and a transceiver unit 910 in the second terminal apparatus receive the fourth downlink control information from the first network apparatus, where the fourth downlink control information indicates that the first terminal apparatus and the second terminal apparatus belong to a first user group, and the fourth downlink control information is further used to indicate a group identifier corresponding to the first user group.

The second information includes at least one of the following information: a communication capability of the first terminal apparatus, a state of a channel between the first terminal apparatus and the second terminal apparatus, a state of a channel between the first terminal apparatus and the first network apparatus, and whether the first terminal apparatus is in an idle state. The first network apparatus determines, based on the second information, that the first terminal apparatus serves as a CUE of the second terminal apparatus, and the first terminal apparatus and the second terminal apparatus belong to the first user group. The first terminal apparatus notifies, by using the fourth downlink control information, the CUE and TUE/SUE that the CUE and TUE/SUE belong to the first user group, and notifies the CUE and TUE/SUE of the group identifier corresponding to the first user group. The group identifier is used to subsequently receive and decode first configuration information and first downlink control information. In at least one embodiment, the first network apparatus determines, by using the second information, that the first terminal apparatus is configured to assist in communication between the first network apparatus and the second terminal apparatus, and sends a message to the first terminal apparatus and the second terminal apparatus to notify the first terminal apparatus and the second terminal apparatus that the first terminal apparatus and the second terminal apparatus belong to the first user group and notify the first terminal apparatus and the second terminal apparatus of the group identifier. To correctly receiving and decoding configuration information and downlink control information by a terminal apparatus, the first terminal apparatus and the second terminal apparatus determine that the first terminal apparatus and the second terminal apparatus belong to the first user group and obtain the group identifier of the user group.

For S301 and S302, refer to steps S201 and S202.

S303: The transceiver unit 710 in the first network apparatus sends fifth downlink control information to the first terminal apparatus and the second terminal apparatus, and the transceiver unit 810 in the first terminal apparatus and the transceiver unit 910 in the second terminal apparatus receive the fifth downlink control information from the first network apparatus, where a first control resource set belongs to the first resource element, the first control resource set sends the fifth downlink control information, the fifth downlink control information indicates a fourth time-frequency resource, and the fourth time-frequency resource belongs to the first resource element.

In at least one embodiment, the first control resource set belongs to the first resource element, the first control resource set sends the fifth downlink control information, the fifth downlink control information indicates the fourth time-frequency resource, and the fourth time-frequency resource belongs to the first resource element. The first network apparatus transmits third information with the first terminal apparatus and the second terminal apparatus on the fourth time-frequency resource. The first control resource set is a downlink control resource set. After the first network apparatus configures the at least one resource element for the first user group, and sends the first downlink control information to the first user group through a PDCCH to determine an active BWP, control information for data transmission between the first user group and the first network apparatus is delivered in the first control resource set. That is, after determining the active BWP used for cooperation, the first terminal apparatus receives downlink control information on a CORESET in the active BWP, and obtain, by using the downlink control information, time-frequency resources corresponding to data transmission for the second time and the third time. For example, the first network apparatus sends the first configuration information and the first downlink control information in a currently preconfigured BWP, and the terminal apparatuses in the first user group receive the first configuration information and the first downlink control information by using a CORESET, a PDCCH, or another channel such as a data channel in the currently preconfigured BWP, determine several BWPs by using the first configuration information, and obtain, by using the first downlink control information, the active BWP and the COREST and the first time-frequency resource that are in the active BWP. The first network apparatus transmits data with the first user group on the first time-frequency resource. During next time of data transmission, the first network apparatus delivers the fifth control information to the first user group on the CORESET in the active BWP, and the first user group receives the fifth downlink control information by using the CORESET in the active BWP, where the fifth downlink control information indicates the fourth time-frequency resource. The fourth time-frequency resource and the first time-frequency resource are different time-frequency resources. That is, the first network apparatus selects, based on a characteristic of a data service in a time of cooperation transmission, time-frequency resources of different sizes for the first user group to use.

S304: The first network apparatus transmits the third information with the first terminal apparatus and the second terminal apparatus on the fourth time-frequency resource. In at least one embodiment, the fourth time-frequency resource and the first time-frequency resource are the different time-frequency resources.

In at least one embodiment, the first user group receives the fifth control information in the first control resource set in the first resource element. The fifth downlink control information indicates the fourth time-frequency resource in the first resource element. The fourth time-frequency resource transmits the third information between the first user group and the first network apparatus. The fourth time-frequency resource and the first time-frequency resource are the different time-frequency resources, which increases flexibility of using a time-frequency resource for communication between the first user group and the first network apparatus.

S305: The transceiver unit 710 in the first network apparatus sends second configuration information to the first terminal apparatus, and the transceiver unit 810 in the first terminal apparatus receives the second configuration information from the first network apparatus, where the second configuration information indicates at least one resource element used for communication between the first terminal apparatus and the first network apparatus. The transceiver unit 710 in the first network apparatus sends second downlink control information to the first terminal apparatus, and the transceiver unit 810 in the first terminal apparatus receives the second downlink control information from the first network apparatus, where the second downlink control information indicates a second resource element in the at least one resource element and a second time-frequency resource, and the second time-frequency resource belongs to the second resource element.

In at least one embodiment, the second configuration information and the second downlink control information are scrambled by using a user identifier corresponding to the first terminal apparatus.

The second configuration information is RRC dedicated information or a part of RRC information scrambled by using the user identity of the first terminal apparatus. In at least one embodiment, the first network apparatus configures, by using the RRC dedicated information, a BWP resource and a CORESET resource that are used by a user for transmission, to enable different users to configure different BWP resources based on sending and receiving capabilities of the users. The base station implements different configurations for the different users through scrambling performed by using UE IDs by using the RRC dedicated information.

S306: The first network apparatus communicates with the first terminal apparatus on the second time-frequency resource.

The first network apparatus receives information from the first terminal apparatus or sends information to the first terminal apparatus on the second time-frequency resource.

In at least one embodiment, the first network apparatus sends the second configuration information and the second downlink control information to the first terminal apparatus to configure several resource elements for the first terminal apparatus, and activates the second resource element and determines the second time-frequency resource in the second resource element, to configure, for the first terminal apparatus, the resource element and the time-frequency resource that are used for the communication between the first terminal apparatus and the first network apparatus. Likewise, a resource element and a time-frequency resource that are used for communication between the second terminal apparatus and the first network apparatus are also configured for the second terminal apparatus. A resource element and a time-frequency resource that are used for communication between a terminal apparatus and the first network apparatus are configured based on a service requirement and a capability of the terminal apparatus, so that resource configuration flexibility is improved.

S307: The transceiver unit 710 in the first network apparatus sends third configuration information to the second terminal apparatus, and the transceiver unit 910 in the second terminal apparatus receives the third configuration information from the first network apparatus, where the third configuration information indicates at least one resource element used for communication between the second terminal apparatus and the first network apparatus. The transceiver unit 710 in the first network apparatus sends third downlink control information to the second terminal apparatus, and the transceiver unit 910 in the first terminal apparatus receives the third downlink control information from the first network apparatus, where the third downlink control information indicates a third resource element in the at least one resource element and a third time-frequency resource, and the third time-frequency resource belongs to the third resource element.

Figure 6:
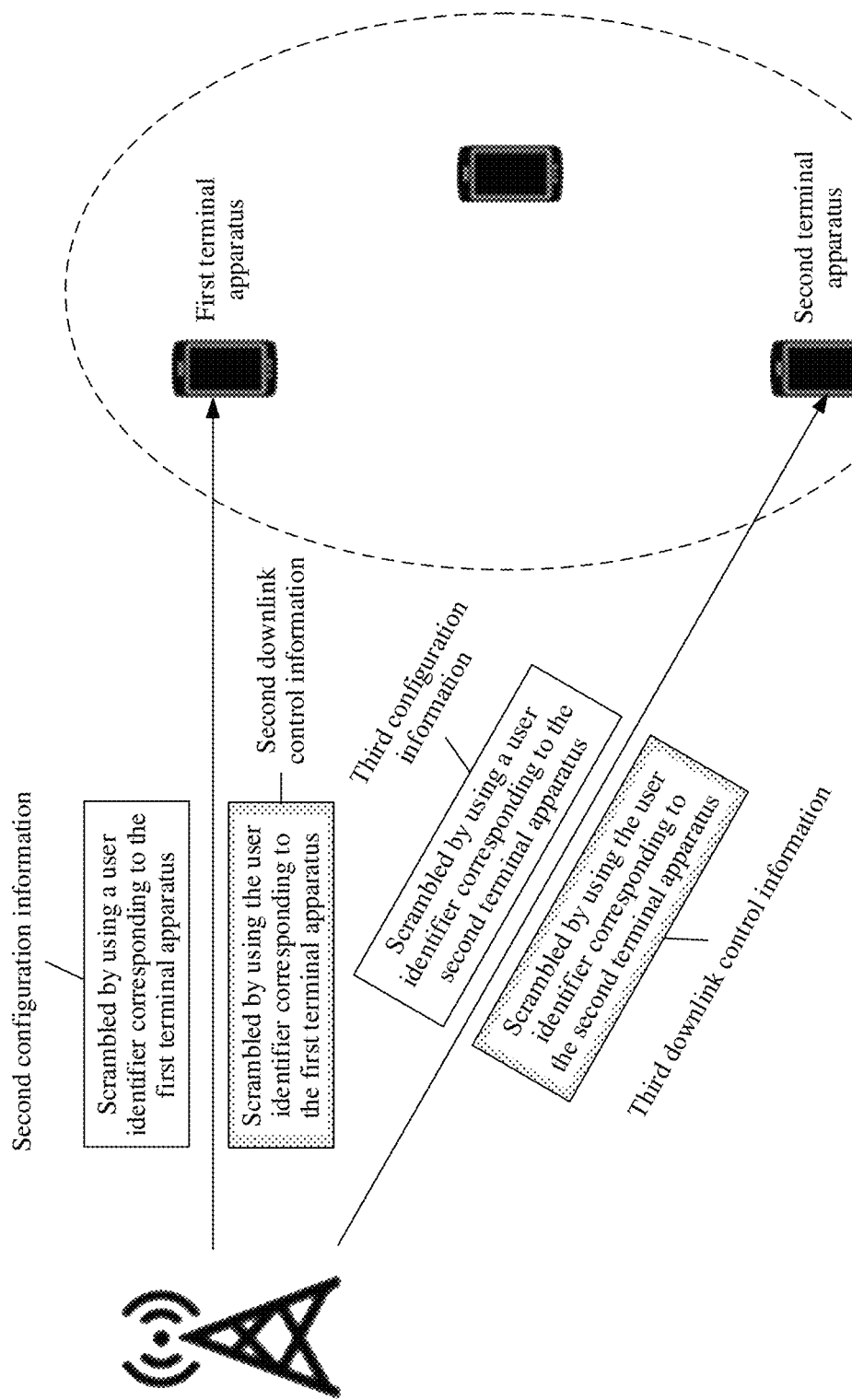
FIG. 6 is a schematic diagram of information indication according to at least one embodiment.

For example, as shown in FIG. 6, the first network apparatus sends the second configuration information and the second downlink control information to the first terminal apparatus, where the second configuration information and the second downlink control information are scrambled by using the user group identifier corresponding to the first terminal apparatus, to notify the first terminal apparatus that the information is used to configure the BWP resource used by the first terminal apparatus for transmission. The first network apparatus sends the third configuration information and the third downlink control information to the second terminal apparatus. The third configuration information and the third downlink control information are scrambled by using a user group identifier corresponding to the second terminal apparatus, to notify the second terminal apparatus that the information is used to configure a BWP resource used by the first terminal apparatus for transmission. A terminal apparatus receives configuration information and downlink control information by using a user identifier of the terminal apparatus, and determines, through scrambling performed by using the user identifier of the terminal user, the resource element and the time-frequency resource used for the communication between the terminal and the first network apparatus. In this way, the resources are configured based on the service requirement and the capability of the terminal apparatus, so that the resource configuration flexibility is improved.

The second configuration information is used to configure, for the first terminal apparatus, the at least one resource element used for the communication between the first terminal apparatus and the first network apparatus. The first downlink control information indicates the second resource element, namely, an active BWP, and the second time-frequency resource in the active BWP. The second time-frequency resource is used by the first network apparatus to receive data from the first terminal apparatus, and is used by the first terminal apparatus to receive data from the first network apparatus. That is, the second time-frequency resource is not used for cooperation transmission but for data transmission between a user UE and a network apparatus. In at least one embodiment, the second resource element and the first resource element are the same or different. To be specific, a cooperative BWP resource used by the first user group and a BWP resource used by the CUE/TUE are a same resource, or are different resources. This is not limited herein. Likewise, a BWP resource and a CORESET resource that are used by the user for transmission and a cooperative BWP resource and a cooperative CORESET resource that are used for user cooperation transmission are the same or different.

For a user, an active cooperative BWP resource and an active BWP resource used by the user for transmission are the same or different, and indication signaling indicating the active cooperative BWP resource and an active cooperative time-frequency resource and indication signaling indicating the active BWP resource and an active time-frequency resource that are used by the user for transmission are the same or different. In response to the indication signaling being the same, and the active cooperative BWP resource and the active BWP resource used by the user for transmission being different, an indication bit is added to identify the two BWP resources, and an indication bit is added to identify the two time-frequency resources.

S308: The first network apparatus communicates with the second terminal apparatus on the third time-frequency resource.

For specific steps and beneficial effects, refer to S306.

Figure 10:
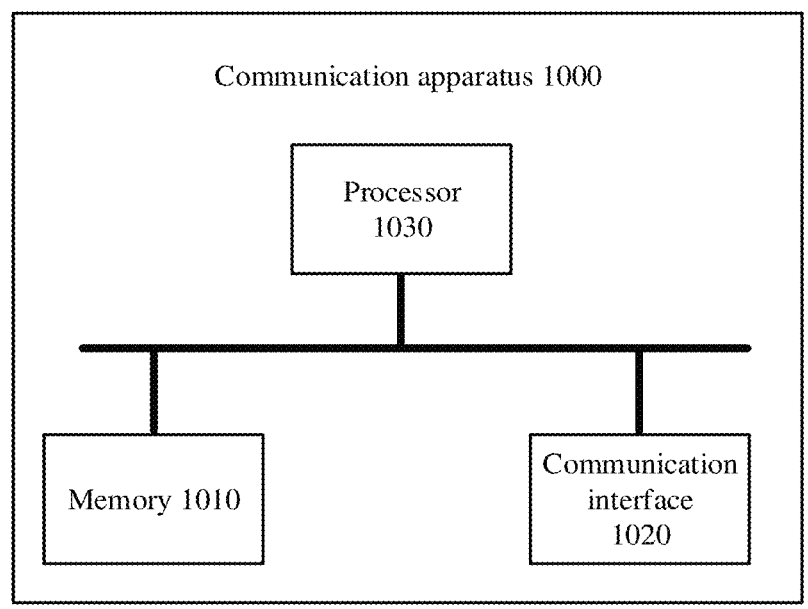
FIG. 10 shows a network apparatus according to at least one embodiment.

FIG. 10 is a schematic block diagram of a network apparatus 1000 according to at least one embodiment described herein. The network apparatus 1000 performs steps performed by the network apparatus in the method in FIG. 2 or in another embodiment. To avoid repetition, details are not described herein again. The communication apparatus 1000 includes:

a memory 1010, configured to store a program;

a communication interface 1020, configured to communicate with another device; and a processor 1030, configured to execute the program in the memory 1010, where in response to the program being executed, the processor 1030 is configured to send first configuration information to a first user group through the communication interface 1020, where the first configuration information indicates at least one resource element, the first user group includes a first terminal apparatus and a second terminal apparatus, and the first terminal apparatus is configured to assist in information transmission between the first network apparatus and the second terminal apparatus.

The first network apparatus sends first downlink control information to the first user group, where the first downlink control information indicates a first resource element in the at least one resource element and a first time-frequency resource, and the first time-frequency resource belongs to the first resource element.

The first network apparatus transmits first information with the first terminal apparatus and the second terminal apparatus on the first time-frequency resource.

Alternatively, the processor 1030 is configured to: through the communication interface 1020, send second configuration information to the first terminal apparatus, where the second configuration information indicates at least one resource element used for communication between the first terminal apparatus and the first network apparatus; send second downlink control information to the first terminal apparatus, where the second downlink control information indicates a second resource element in the at least one resource element and a second time-frequency resource, and the second time-frequency resource belongs to the second resource element; communicate with the first terminal apparatus on the second time-frequency resource; send third configuration information to the second terminal apparatus, where the third configuration information indicates at least one resource element used for communication between the second terminal apparatus and the first network apparatus; send third downlink control information to the second terminal apparatus, where the third downlink control information indicates a third resource element in the at least one resource element and a third time-frequency resource, and the third time-frequency resource belongs to the third resource element; and communicate with the second terminal apparatus on the third time-frequency resource.

The communication apparatus 1000 shown in FIG. 10 is a chip or a circuit, for example, a chip or a circuit that is disposed in a terminal device. The communication interface 1020 is alternatively a transceiver. The transceiver includes a receiver and a transmitter. In at least one embodiment, the communication apparatus 1000 further includes a bus system. The processor 1030, the memory 1010, and the communication interface 1020 is connected by using a bus. The processor 1030, the memory 1010, and the communication interface 1020 are alternatively connected by using a circuit or cabling instead of a bus.

The processor 1030, the memory 1010, the receiver, and the transmitter are coupled and connected, and communicate with each other, or are connected by using the bus system. The processor 1030 is configured to execute instructions stored in the memory 1010, to control the receiver to receive a signal and control the transmitter to send a signal, and complete the steps performed by the network device in the communication method described herein in at least one embodiment. The receiver and the transmitter are a same physical entity or different physical entities. In response to the receiver and the transmitter being the same physical entity, the receiver and the transmitter are collectively referred to as a transceiver. The memory 1010 is integrated into the processor 1030, or is disposed separately from the processor 1030.

Functions of the receiver and the transmitter are implemented by using a transceiver circuit or a dedicated transceiver chip. The processor 1030 is implemented by using a dedicated processing chip, a processing circuit, a processor, or a general-purpose chip.

Figure 11:
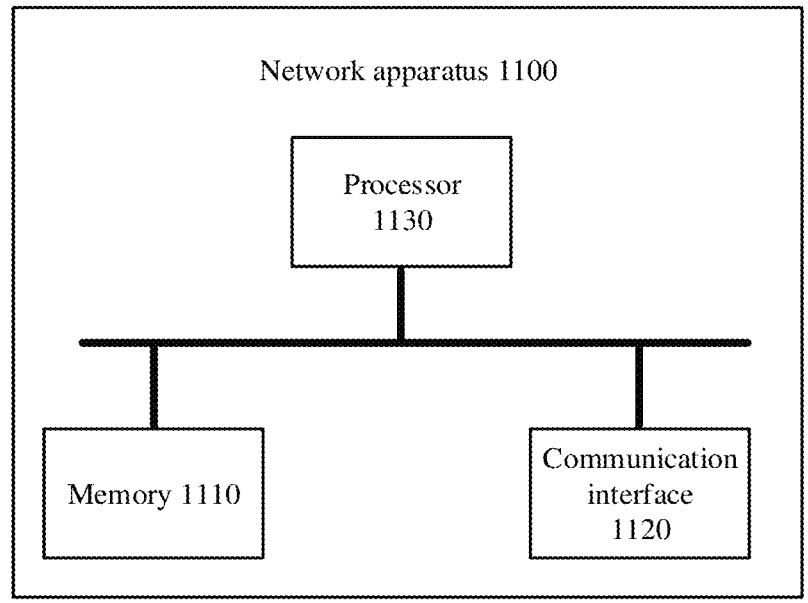
FIG. 11 shows a communication apparatus according to at least one embodiment.

FIG. 11 is a schematic block diagram of a terminal apparatus 1100 according to at least one embodiment. The communication apparatus 1100 performs the steps performed by the first terminal apparatus in the foregoing method. To avoid repetition, details are not described herein again. The communication apparatus 1100 includes:

a memory 1110, configured to store a program; a communication interface 1120, configured to communicate with another device; and a processor 1130, configured to execute the program in the memory 1110, where in response to the program being executed, the processor 1130 is configured to: through the communication interface 1120, receive first configuration information from a first network apparatus, where the first configuration information is further sent to another terminal apparatus in a first user group, the first configuration information indicates at least one resource element, the first user group includes the first terminal apparatus and a second terminal apparatus, and the first terminal apparatus assists in information transmission between the first network apparatus and the second terminal apparatus;

receive first downlink control information from the first network apparatus, where the first downlink control information is further sent to the another terminal apparatus in the first user group, the first downlink control information indicates a first resource element in the at least one resource element and a first time-frequency resource, and the first time-frequency resource belongs to the first resource element; and transmit first information with the first network apparatus on the first time-frequency resource.

The terminal apparatus 1100 shown in FIG. 11 is a chip or a circuit, for example, a chip or a circuit that is disposed in a network device. The communication interface 1120 is alternatively a transceiver. The transceiver includes a receiver and a transmitter. In at least one embodiment, the communication apparatus 1100 further includes a bus system. The processor 1130, the memory 1110, and the communication interface 1120 are connected by using a bus. Certainly, the processor 1130, the memory 1110, and the communication interface 1120 is alternatively connected by using a circuit or cabling instead of a bus.

The processor 1130, the memory 1110, the receiver, and the transmitter are coupled and connected, and communicate with each other, or are connected by using the bus system. The processor 1130 is configured to execute instructions stored in the memory 1110, to control the receiver to receive a signal and control the transmitter to send a signal, and complete the steps performed by the network device in the communication method described herein in at least embodiment. The receiver and the transmitter are a same physical entity or different physical entities. In response to the receiver and the transmitter being the same physical entity, the receiver and the transmitter are collectively referred to as a transceiver. The memory 1110 is integrated into the processor 1130, or us disposed separately from the processor 1130.

Functions of the receiver and the transmitter are implemented by using a transceiver circuit or a dedicated transceiver chip. The processor 1130 is implemented by using a dedicated processing chip, a processing circuit, a processor, or a general-purpose chip.

Figure 12:
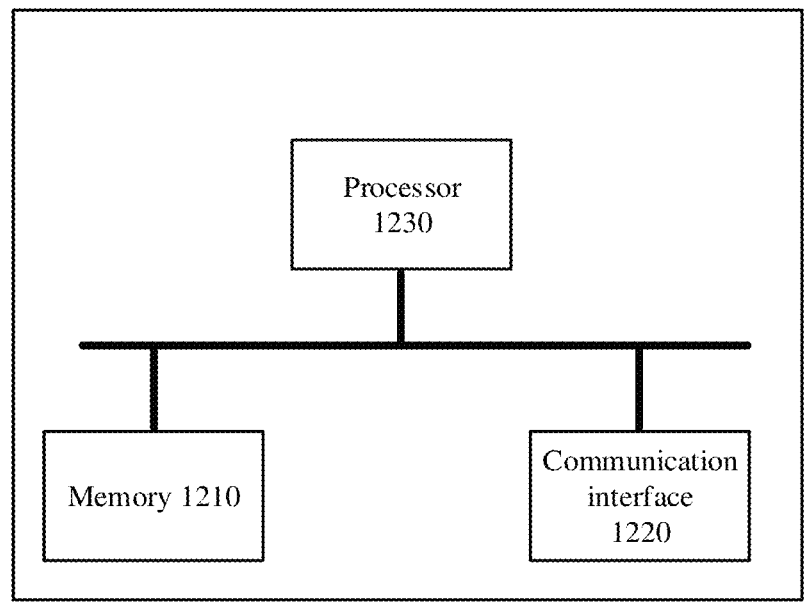
FIG. 12 shows a communication apparatus according to at least one embodiment.

FIG. 12 is a schematic block diagram of a terminal apparatus 1200 according to at least one embodiment. The terminal apparatus 1200 performs the steps performed by the second terminal apparatus as described herein in at least one embodiment. To avoid repetition, details are not described herein again. The communication apparatus 1200 includes:

a memory 1210, configured to store a program; a communication interface 1220, configured to communicate with another device; and a processor 1130, configured to execute the program in the memory 1210, where in response to the program being executed, the processor 1230 is configured to: through the communication interface 1220, receive first configuration information from a first network apparatus, where the first configuration information is further sent to another terminal apparatus in a first user group, the first configuration information indicates at least one resource element, the first user group includes a first terminal apparatus and the second terminal apparatus, and the first terminal apparatus is configured to assist in information transmission between the first network apparatus and the second terminal apparatus; receive first downlink control information from the first network apparatus, where the first downlink control information is further sent to the another terminal apparatus in the first user group, the first downlink control information indicates a first resource element in the at least one resource element and a first time-frequency resource, and the first time-frequency resource belongs to the first resource element; and transmit first information with the first network apparatus on the first time-frequency resource.

The terminal apparatus 1200 shown in FIG. 12 is a chip or a circuit, for example, a chip or a circuit that is disposed in a network device. The communication interface 1220 is alternatively a transceiver. The transceiver includes a receiver and a transmitter. In at least one embodiment, the communication apparatus 1200 further includes a bus system. The processor 1230, the memory 1210, and the communication interface 1220 are connected by using a bus. Certainly, the processor 1230, the memory 1210, and the communication interface 1220 are alternatively connected by using a circuit or cabling instead of a bus.

The processor 1230, the memory 1210, the receiver, and the transmitter are coupled and connected, and communicate with each other, or are connected by using the bus system. The processor 1230 is configured to execute instructions stored in the memory 1210, to control the receiver to receive a signal and control the transmitter to send a signal, and complete the steps performed by the network device in the communication method described herein in at least one embodiment. The receiver and the transmitter are a same physical entity or different physical entities. In response to the receiver and the transmitter being the same physical entity, the receiver and the transmitter are collectively referred to as a transceiver. The memory 1210 is integrated into the processor 1230, or is disposed separately from the processor 1230.

Functions of the receiver and the transmitter are implemented by using a transceiver circuit or a dedicated transceiver chip. The processor 1230 is implemented by using a dedicated processing chip, a processing circuit, a processor, or a general-purpose chip.

In at least one embodiment, the disclosed systems, apparatuses, and methods are implemented in other manners. For example, the apparatus described herein in at least one embodiment are merely examples. For example, division into the units is merely logical function division and are other division during actual implementation. For example, a plurality of units or components are combined or integrated into another system, or some features are ignored or not performed. In addition, the displayed or discussed mutual couplings or direct couplings or communication connections are implemented through some interfaces. The indirect couplings or communication connections between the apparatuses or units are implemented in electrical, mechanical, or other forms.

The units described as separate parts are physically separate, or not physically separate, and parts displayed as units are or are not physical units, and are located in one position, or are distributed on a plurality of network units. Some or all of the units are selected based on achieving the solutions and advantages described herein in at least one embodiment.

In addition, in at least one embodiment, functional units are integrated into one processing unit, each of the units exist alone physically, or two or more units are integrated into one unit. The integrated unit is implemented in a form of hardware, or is implemented in a form of a software functional unit.

In response to the integrated unit being implemented in the form of a software functional unit and being sold or used as an independent product, the integrated unit is stored in a computer-readable storage medium. Based on such an understanding, the technical solutions described herein in at least one embodiment are implemented in the form of a software product. The computer software product is stored in a storage medium and includes several instructions for instructing a computer device (which is a personal computer, a server, a network device, or the like) to perform all or some of the steps of the methods described herein in at least one embodiment. The foregoing storage medium includes: any medium that stores program code, such as a USB flash drive, a removable hard disk, a read-only memory (ROM, Read-Only Memory), a random access memory (RAM, Random Access Memory), a magnetic disk, or an optical disc.

What is claimed is:

1. A configuration information sending method, comprising:
    sending, by a first network apparatus, first configuration information to a first cooperative user group, wherein the first configuration information indicates at least one resource element for cooperative downlink transmission from the first network apparatus, the first cooperative user group includes a first cooperative terminal apparatus and a second cooperative terminal apparatus, and the first cooperative terminal apparatus is configured to assist in information transmission between the first network apparatus and the second cooperative terminal apparatus;
    sending, by the first network apparatus, first downlink control information to the first cooperative user group, wherein the first downlink control information indicates a first resource element for cooperative downlink transmission from the first network apparatus in the at least one resource element and a first time-frequency resource, and the first time-frequency resource belongs to the first resource element for cooperative downlink transmission from the first network apparatus; and
    transmitting, by the first network apparatus, first information with the first cooperative terminal apparatus and the second cooperative terminal apparatus on the first time-frequency resource for cooperative downlink transmission from the first network apparatus.

2. The method according to claim 1, wherein the method further comprises:
    sending, by the first network apparatus, second configuration information to the first cooperative terminal apparatus, wherein the second configuration information indicates at least one resource element used for cooperative uplink communication between the first cooperative terminal apparatus and the first network apparatus;
    sending, by the first network apparatus, second downlink control information to the first cooperative terminal apparatus, wherein the second downlink control information indicates a second resource element for cooperative downlink transmission from the first network apparatus in the at least one resource element and a second time-frequency resource, and the second time-frequency resource belongs to the second resource element for cooperative downlink transmission from the first network apparatus;
    communicating, by the first network apparatus, with the first cooperative terminal apparatus on the second time-frequency resource;
    sending, by the first network apparatus, third configuration information to the second cooperative terminal apparatus, wherein the third configuration information indicates at least one resource element used for cooperative downlink communication between the second cooperative terminal apparatus and the first network apparatus;
    sending, by the first network apparatus, third downlink control information to the second cooperative terminal apparatus, wherein the third downlink control information indicates a third resource element for cooperative downlink transmission from the first network apparatus in the at least one resource element and a third time-frequency resource, and the third time-frequency resource belongs to the third resource element for cooperative downlink transmission from the first network apparatus; and
    communicating, by the first network apparatus, with the second cooperative terminal apparatus on the third time-frequency resource.

3. The method according to claim 1, wherein the method further comprises:
    scrambling the first configuration information and the first downlink control information by using a group identifier corresponding to the first user group.

4. The method according to claim 1, wherein the method further comprises:
    determining, by the first network apparatus, based on second information received from the first terminal apparatus, that the first terminal apparatus is configured to assist in the information transmission between the first network apparatus and the second terminal apparatus; and
    sending, by the first network apparatus, fourth downlink control information to the first terminal apparatus and the second terminal apparatus, wherein the fourth downlink control information indicates that the first terminal apparatus and the second terminal apparatus belong to the first user group, and the fourth downlink control information is further used to indicate a group identifier corresponding to the first user group.

5. The method according to claim 1, wherein a first control resource set belongs to the first resource element, the method further comprising:
    sending, in the first control resource set, fifth downlink control information, the fifth downlink control information indicates a fourth time-frequency resource, and the fourth time-frequency resource belongs to the first resource element; and
    transmitting, by the first network apparatus, third information with the first terminal apparatus and the second terminal apparatus on the fourth time-frequency resource.

6. A configuration information receiving method, comprising:
    receiving, by a first cooperative terminal apparatus, first configuration information from a first network apparatus, wherein the first configuration information is further sent to another cooperative terminal apparatus in a first cooperative user group, the first configuration information indicates at least one resource element for cooperative downlink transmission from the first network apparatus, the first cooperative user group includes the first cooperative terminal apparatus and a second cooperative terminal apparatus, and the first cooperative terminal apparatus assists in information transmission between the first network apparatus and the second cooperative terminal apparatus;

receiving, by the first cooperative terminal apparatus, first downlink control information from the first network apparatus, wherein the first downlink control information is further sent to the another cooperative terminal apparatus in the first cooperative user group, the first downlink control information indicates a first resource element for cooperative downlink transmission from the first network apparatus in the at least one resource element and a first time-frequency resource, and the first time-frequency resource belongs to the first resource element for cooperative downlink transmission from the first network apparatus; and transmitting, by the first cooperative terminal apparatus, first information with the first network apparatus on the first time-frequency resource for cooperative downlink transmission from the first network apparatus.

7. The method according to claim 6, wherein the method further comprises:

receiving, by the first cooperative terminal apparatus, second configuration information from the first network apparatus, wherein the second configuration information indicates at least one resource element used for cooperative downlink communication between the first cooperative terminal apparatus and the first network apparatus;

receiving, by the first cooperative terminal apparatus, second downlink control information from the first network apparatus, wherein the second downlink control information indicates a second resource element for cooperative downlink transmission from the first network apparatus in the at least one resource element and a second time-frequency resource, and the second time-frequency resource belongs to the second resource element for cooperative downlink transmission from the first network apparatus; and communicating, by the first network apparatus, with the first cooperative terminal apparatus on the second time-frequency resource for cooperative downlink transmission from the first network apparatus.

8. The method according to claim 6, wherein the method further comprises:

scrambling the first configuration information and the first downlink control information by using a group identifier corresponding to the first user group.

9. The method according to claim 6, wherein the method further comprises:

sending, by the first terminal apparatus, second information to the first network apparatus, wherein the second information indicates that the first terminal apparatus is configured to assist in the information transmission between the first network apparatus and the second terminal apparatus; and receiving, by the first terminal apparatus, fourth downlink control information from the first network apparatus, wherein the fourth downlink control information indicates that the first terminal apparatus and the second terminal apparatus belong to the first user group, and the fourth downlink control information is further used to indicate a group identifier corresponding to the first user group.

10. The method according to claim 6, wherein a first control resource set belongs to the first resource element, the method further comprising:

sending, by the first control resource set, fifth downlink control information, the fifth downlink control information indicates a fourth time-frequency resource, and the fourth time-frequency resource belongs to the first resource element; and transmitting, by the first terminal apparatus, third information with the first network apparatus on the fourth time-frequency resource.

11. A communications apparatus, comprising:

a memory configured to store program instructions; and one or more processors configured to execute the instructions to cause the one or more processors to:

send first configuration information to a first cooperative user group, wherein the first configuration information indicates at least one resource element for cooperative downlink transmission from the first network apparatus, the first cooperative user group includes a first cooperative terminal apparatus and a second cooperative terminal apparatus, and the one or more processors receiving indication from the first cooperative terminal apparatus that the first cooperative terminal apparatus is configured to assist in information transmission between the one or more processors and the second cooperative terminal apparatus;

send first downlink control information to the first cooperative user group, wherein the first downlink control information indicates a first resource element for cooperative downlink transmission from the first network apparatus in the at least one resource element and a first time-frequency resource, and the first time-frequency resource belongs to the first resource element for cooperative downlink transmission from the first network apparatus; and transmit first information with the first cooperative terminal apparatus and the second cooperative terminal apparatus on the first time-frequency resource for cooperative downlink transmission from the first network apparatus.

12. The communications apparatus according to claim 11, wherein the instructions cause the one or more processors to:

send second configuration information to the first cooperative terminal apparatus, wherein the second configuration information indicates at least one resource element used for cooperative uplink communication between the first cooperative terminal apparatus and the one or more processors;

send second downlink control information to the first cooperative terminal apparatus, wherein the second downlink control information indicates a second resource element for cooperative downlink transmission from the first network apparatus in the at least one resource element and a second time-frequency resource, and the second time-frequency resource belongs to the second resource element for cooperative downlink transmission from the first network apparatus;

communicate with the first cooperative terminal apparatus on the second time-frequency resource;

send third configuration information to the second cooperative terminal apparatus, wherein the third configuration information indicates at least one resource element used for cooperative downlink communication between the second cooperative terminal apparatus and the one or more processors;

send third downlink control information to the second cooperative terminal apparatus, wherein the third downlink control information indicates a third resource element for cooperative downlink transmission from the first network apparatus in the at least one resource element and a third time-frequency resource, and the third time-frequency resource belongs to the third resource element for cooperative downlink transmission from the first network apparatus; and configure a transceiver unit to communicate with the second terminal apparatus on the third time-frequency resource.

13. The communications apparatus according to claim 11, wherein the instructions cause the one or more processors to:
scramble the first configuration information and the first downlink control information by using a group identifier corresponding to the first user group.

14. The communications apparatus according to claim 11, wherein the instructions cause the one or more processors to:
determine, based on second information received from the first terminal apparatus, that the first terminal apparatus is configured to assist in the information transmission between the one or more processors and the second terminal apparatus; and send fourth downlink control information to the first terminal apparatus and the second terminal apparatus, wherein the fourth downlink control information indicates that the first terminal apparatus and the second terminal apparatus belong to the first user group, and the fourth downlink control information is further used to indicate a group identifier corresponding to the first user group.

15. The communications apparatus according to claim 11, wherein a first control resource set belongs to the first resource element, and wherein the instructions cause the one or more processors to:

use the first control resource set to send fifth downlink control information, the fifth downlink control information indicates a fourth time-frequency resource, and the fourth time-frequency resource belongs to the first resource element; and transmit third information, using the first terminal apparatus and the second terminal apparatus, on the fourth time-frequency resource.

16. A communications apparatus, comprising:
a memory configured to store program instructions; and
one or more processors configured to execute the instructions to cause the one or more processors to:

receive first configuration information from a first network apparatus, wherein the first configuration information is further sent to another cooperative terminal apparatus in a first cooperative user group, the first configuration information indicates at least one resource element for cooperative downlink transmission from the first network apparatus, the first cooperative user group includes a second cooperative terminal apparatus, and the one or more processors assists in information transmission between the first network apparatus and the second cooperative terminal apparatus;

configure a transceiver unit to receive first downlink control information from the first network apparatus, wherein the first downlink control information is further sent to the another cooperative terminal apparatus in the first cooperative user group, the first downlink control information indicates a first resource element for cooperative downlink transmission from the first network apparatus in the at least one resource element and a first time-frequency resource, and the first time-frequency resource belongs to the first resource element for cooperative downlink transmission from the first network apparatus; and configure the transceiver unit to transmit first information with the first network apparatus on the first time-frequency resource for cooperative downlink transmission from the first network apparatus.

17. The communications apparatus according to claim 16, wherein the instructions cause the one or more processors to:
configure the transceiver unit to receive second configuration information from the first network apparatus, wherein the second configuration information indicates at least one resource element used for cooperative uplink communication between the one or more processors and the first network apparatus;

configure the transceiver unit to receive second downlink control information from the first network apparatus, wherein the second downlink control information indicates a second resource element for cooperative downlink transmission from the first network apparatus in the at least one resource element and a second time-frequency resource, and the second time-frequency resource belongs to the second resource element for cooperative downlink transmission from the first network apparatus; and configure the transceiver unit to communicate using the second time-frequency resource for cooperative downlink transmission from the first network apparatus.

18. The communications apparatus according to claim 16, wherein the instructions cause the one or more processors to:
scramble the first configuration information and the first downlink control information by using a group identifier corresponding to the first user group.

19. The communications apparatus according to claim 16, wherein the instructions cause the one or more processors to:
send second information to the first network apparatus, wherein the second information indicates that the one or more processors is configured to assist in the information transmission between the first network apparatus and the second terminal apparatus; and receive fourth downlink control information from the first network apparatus, wherein the fourth downlink control information indicates that the second terminal apparatus belongs to the first user group, and the fourth downlink control information is further used to indicate a group identifier corresponding to the first user group.

20. The communications apparatus according to claim 16, wherein a first control resource set belongs to the first resource element, the instructions cause the one or more processors to:

send, by the first control resource set, fifth downlink control information, the fifth downlink control information indicates a fourth time-frequency resource, and the fourth time-frequency resource belongs to the first resource element; and transmit third information, using the first network apparatus, on the fourth time-frequency resource.

* * * * *